(12) United States Patent
Richardson Hill et al.

(10) Patent No.: US 12,316,938 B2
(45) Date of Patent: May 27, 2025

(54) PLAYGROUND APPARATUS COMPRISING A CAMERA SUPPORT

(71) Applicant: PlayCore Wisconsin, Inc., Chattanooga, TN (US)

(72) Inventors: Lindsay E. Richardson Hill, Chattanooga, TN (US); Sam Smith, Fort Payne, AL (US); Steven Dupree, Gadsden, AL (US); Charles Walcott, Chattanooga, TN (US); Benjamin Thornberry, Centre, AL (US)

(73) Assignee: PLAYCORE WISCONSIN, INC., Chattanooga, TN (US)

( * ) Notice: Subject to any disclaimer, the term of this patent is extended or adjusted under 35 U.S.C. 154(b) by 0 days.

(21) Appl. No.: 18/418,997

(22) Filed: Jan. 22, 2024

(65) Prior Publication Data

US 2024/0171837 A1 May 23, 2024

Related U.S. Application Data

(63) Continuation of application No. 17/382,096, filed on Jul. 21, 2021, now Pat. No. 11,917,275, which is a continuation of application No. 16/529,526, filed on Aug. 1, 2019, now Pat. No. 11,102,385.

(60) Provisional application No. 62/713,197, filed on Aug. 1, 2018.

(51) Int. Cl.
| | |
|---|---|
| *A63G 1/12* | (2006.01) |
| *A63G 9/00* | (2006.01) |
| *H04B 1/3888* | (2015.01) |
| *H04N 23/54* | (2023.01) |

(52) U.S. Cl.
CPC ............... *H04N 23/54* (2023.01); *A63G 9/00* (2013.01); *H04B 1/3888* (2013.01); *A63G 1/12* (2013.01)

(58) Field of Classification Search
CPC ... A63G 1/08; A63G 1/12; A63G 1/28; A63G 1/34; A63G 1/38; A63G 1/48; H04N 5/2253; H04N 23/54; H04B 1/3888
USPC ..................................................... 472/29–42
See application file for complete search history.

(56) References Cited

U.S. PATENT DOCUMENTS

| | | | | |
|---|---|---|---|---|
| 1,877,256 | A | * | 9/1932 | Siebert ..................... A63G 1/48 472/1 |
| 2,101,719 | A | | 12/1937 | Niebuhr |
| 3,612,520 | A | | 10/1971 | Chang et al. |
| 4,160,553 | A | * | 7/1979 | Fleischer ............. A47D 13/107 280/87.051 |
| 5,415,589 | A | | 5/1995 | Hall, Jr. |
| 7,374,522 | B2 | | 5/2008 | Arnold |
| 8,475,342 | B2 | | 7/2013 | Flowers et al. |
| 8,751,158 | B2 | | 6/2014 | Kamio et al. |
| 9,468,296 | B1 | | 10/2016 | Chen |
| 10,384,745 | B1 | | 8/2019 | Vallabh et al. |
| 11,123,646 | B1 | | 9/2021 | Amor |
| 2007/0034753 | A1 | | 2/2007 | Lee |

(Continued)

*Primary Examiner* — Kien T Nguyen
(74) *Attorney, Agent, or Firm* — McAndrews, Held & Malloy, Ltd.

(57) ABSTRACT

Embodiments of the present disclosure are directed to a playground apparatus that is configured to support a camera, typically a smartphone or similar photo/video device. The apparatus is configured to both (a) position the camera to take a photograph or video of the user during the play activity and (b) to maintain the camera in place during the play activity. Embodiments of the play apparatus include swings, whirls, and spinners.

16 Claims, 26 Drawing Sheets

(56) References Cited

U.S. PATENT DOCUMENTS

| | | |
|---|---|---|
| 2010/0317447 A1 | 12/2010 | Bapst et al. |
| 2015/0057092 A1 | 2/2015 | Norquist et al. |
| 2020/0307466 A1 | 10/2020 | Pliego |
| 2021/0283461 A1 | 9/2021 | Aref |

* cited by examiner

PLAYGROUND APPARATUS COMPRISING A CAMERA SUPPORT

The present application is a continuation of U.S. patent application Ser. No. 17/382,096, filed on Jul. 21, 2021, which is a continuation of U.S. patent application Ser. No. 16/529,526, filed on Aug. 1, 2019 and granted as U.S. Pat. No. 11,102,385 on Aug. 24, 2021, which claims priority to U.S. Provisional Patent Application No. 62/713,197, filed on Aug. 1, 2018, the entireties of which are incorporated by reference herein.

FIELD

The present invention relates generally to playground apparatuses that are configured to support a camera, typically a smartphone that is capable of taking photographs and/or videos. The playground apparatus provides a holder in which the camera is positioned and angled so that one can take a photograph (i.e. selfie) and/or a video of the user enjoying the play activity. By positioning a camera in or on various playground apparatuses, one may capture the reactions of the users participating in a variety of play activities. In some embodiments, the playground apparatus is a swing comprising a camera support at the front of the swing seat, a whirl comprising one or more camera supports at or near a central axis of the whirl, or a spinner comprising a camera support at the front of the spinner seat.

BACKGROUND

With the popularity of "selfies" and people posting videos of themselves or their friends and family to social media, the use of digital cameras is ubiquitous. Parents often want to capture photos/video of their children at play for posterity or to be able to share with friends and relatives. When using playground equipment, however, it is not always easy or practical to take photo/video due to poor angles, safety concerns, etc. The inventors have recognized that it would be desirable to have an integrated way to support a digital camera (e.g. a smartphone) in or on a playground apparatus.

SUMMARY OF THE DISCLOSURE

Embodiments of the present disclosure are directed to various playground devices that have been configured to include a mount for a smartphone, wherein the smartphone mount is positioned and configured to point the camera of a smartphone toward a user while the user is participating in the play activity. Using the devices, one may take photographs or videos of a user enjoying a play activity in a hands-free manner. The devices include swings, whirls (e.g. merry-go-rounds), bouncers, spinners, rocking apparatus, playground music equipment, monkey bars, see saws, track rides, zip tracks or lines, and slides.

Embodiments of the present disclosure are specifically directed to swings that include a mount for a smartphone that is positioned and configured to provide for photographing the swing seat occupant during use. In some embodiments, a digital camera (e.g. smartphone) may be placed in a compartment integrated into a seat, such as a child's swing seat. The compartment may comprise an aperture that is sized and shaped for holding a typical smartphone. The aperture may be configured to hold the camera in the correct position and angle to photograph (or take video of) the swinging child in a hands-free manner. An icon on or near the compartment may indicate the function of the compartment (i.e. for insertion of a phone).

In some embodiments, the child swing seat with the integrated smartphone holder may be attached to an adult seat such that the two share a swinging motion.

In other embodiments, a swing seat may include a connector that attaches the seat to a camera support element, which is located at a desired distance and height for photographing the occupant of the seat.

Embodiments of the present disclosure are also specifically directed to whirls that include a mount for a smartphone that is positioned and configured to provide for photographing an occupant of at least one of the seats of the whirl during use. In some embodiments, a digital camera (e.g. smartphone) may be placed in a compartment integrated into either the base of the whirl or a smartphone support element that is connected to the base. The compartment may comprise an aperture that is sized and shaped for holding a typical smartphone. The aperture may be configured to hold the camera in the correct position and angle to photograph (or take video of) the occupant in a hands-free manner. An icon on or near the compartment may indicate the function of the compartment (i.e. for insertion of a phone).

In some embodiments, the whirl may comprise a plurality of apertures, each of the plurality of apertures being sized and configured to hold a smartphone at a location and angle to photograph the face of an occupant of at least one of the whirl seats.

In some embodiments, the whirl may not include seats but rather one or more handles which are configured for a child or children to hold during operation of the whirl. In those embodiments, the mount for a smartphone may be positioned and configured to provide for photographing a user while the user holds at least one of the handles during operation of the whirl.

Embodiments of the present disclosure are also specifically directed to spinners that include a mount for a smartphone that is positioned and configured to provide for photographing an occupant of the spinner seat during use. In some embodiments, a digital camera (e.g. smartphone) may be placed in a compartment integrated into the spinner seat, such as in the front wall of the spinner seat. The compartment may comprise an aperture that is sized and shaped for holding a typical smartphone. The aperture may be configured to hold the camera in the correct position and angle to photograph (or take video of) the spinning child in a hands-free manner.

In other embodiments, the spinner seat may comprise a projection that contains the smartphone mount.

In some embodiments, the spinner seat may be sized and configured to hold, at the same time, both an adult and a child. In these embodiments, the aperture may be configured to hold the camera in the correct position and angle to photograph (or take video of) both the adult and child occupant of the spinner seat during use.

In some embodiments, the spinner may be configured to provide an occupant or occupants of the spinner seat with a multi-axis movement, such as both a spinning and a rotating movement.

BRIEF DESCRIPTION OF THE DRAWINGS

The drawings are provided to help illustrate and describe certain features of the aspects and embodiments of the disclosure. However, the claims and disclosure are not limited to the precise arrangements and instrumentalities of the features depicted in the drawings.

DETAILED DESCRIPTION

Before continuing to describe various aspects and embodiments in further detail, it is to be understood that this disclosure is not limited to specific compositions or process steps and may vary. As used in this specification and the appended claims, the singular form "a", "an" and "the" include plural referents unless the context clearly dictates otherwise.

Unless defined otherwise, all technical and scientific terms used herein have the same meaning as commonly understood by one of ordinary skill in the art to which this invention is related.

The inventors have advantageously discovered it is desirable to have an integrated way to support a digital camera (e.g. a smartphone) in or on a variety of playground apparatuses. This allows for capturing images of a user at preferable angles and in a hands-free manner during play.

The inventors have further discovered that it is desirable to have the camera support on the playground apparatus integrated in a manner so as not to need a separate photographer (or videographer). In this manner, the image capture can be focused on the user of the apparatus while they are playing and operated in a hands-free manner.

Various types of playground equipment can be configured to support a camera in order to capture images of the user during use. Types of playground equipment include, but are not limited to, swings (including ADA swings), whirls (e.g. merry-go-rounds), bouncers, spinners, rocking apparatus (including inclusive types), playground music equipment, monkey bars, see saws, track rides, zip tracks or lines, and slides.

Swings

In one set of embodiments, the playground apparatus is a swing.

Figure 1:
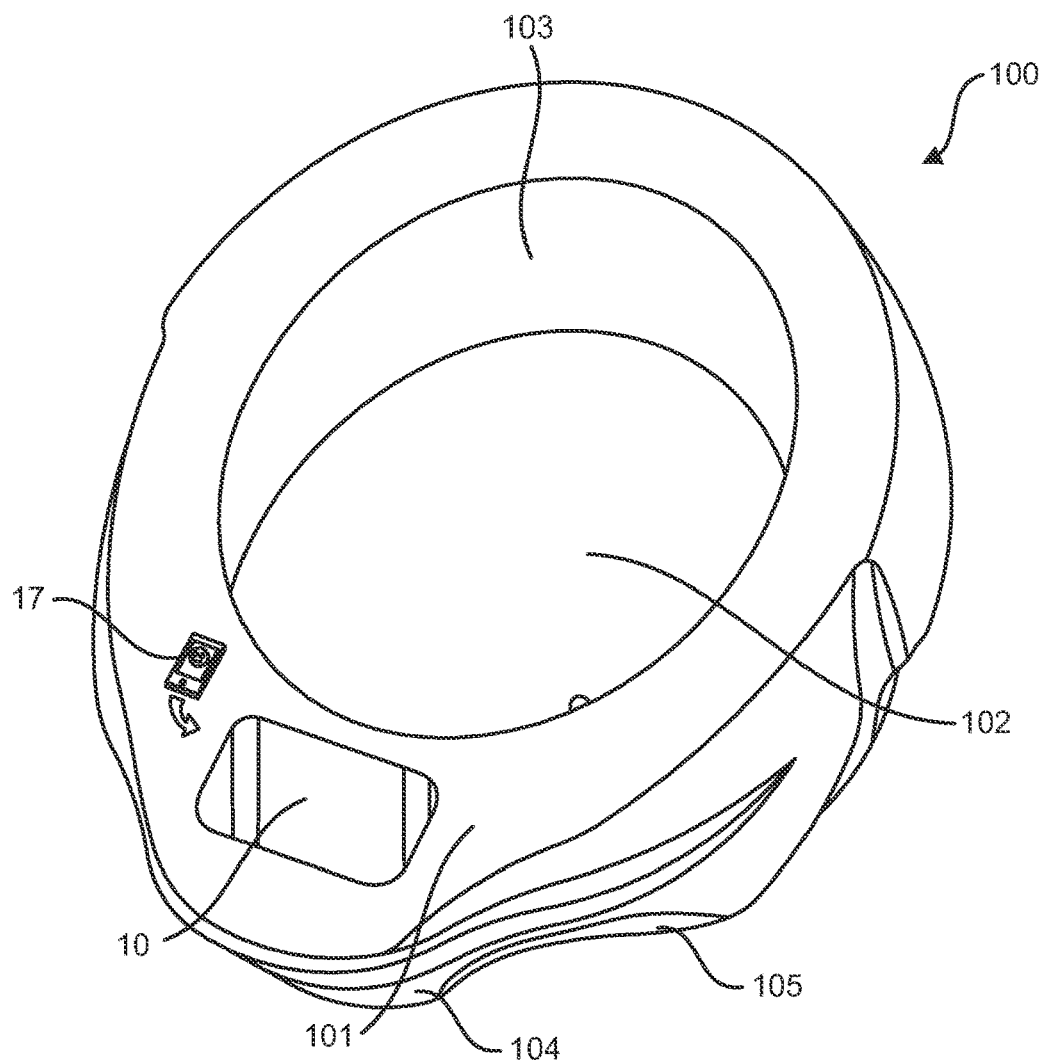
FIG. 1 is a top perspective view of an embodiment of a child swing seat having a compartment configured to position a phone to take a photograph of the seat occupant during the swinging motion.
Figure 2:
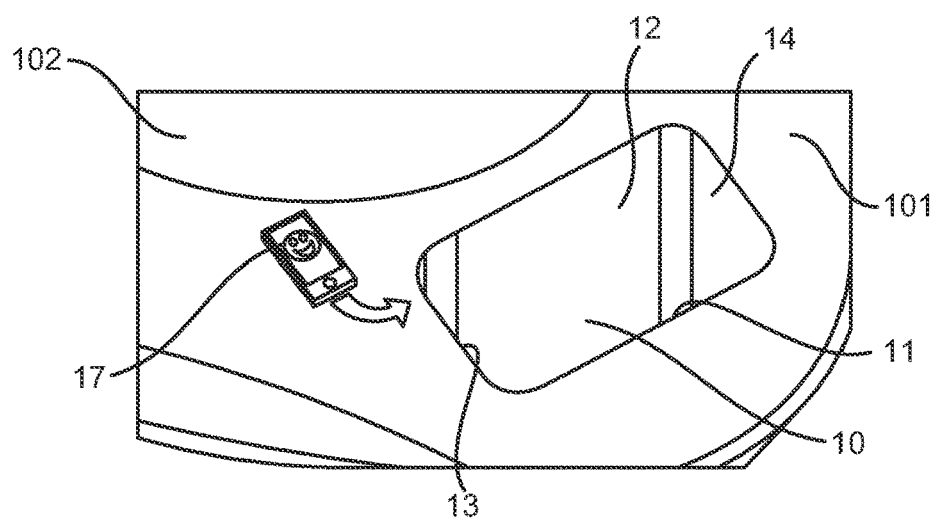
FIG. 2 is a top perspective view of a portion of the swing seat shown in FIG. 1, showing details of the compartment and an example of a visual indicator that the compartment is for holding a smartphone to take a photograph.
Figure 3:
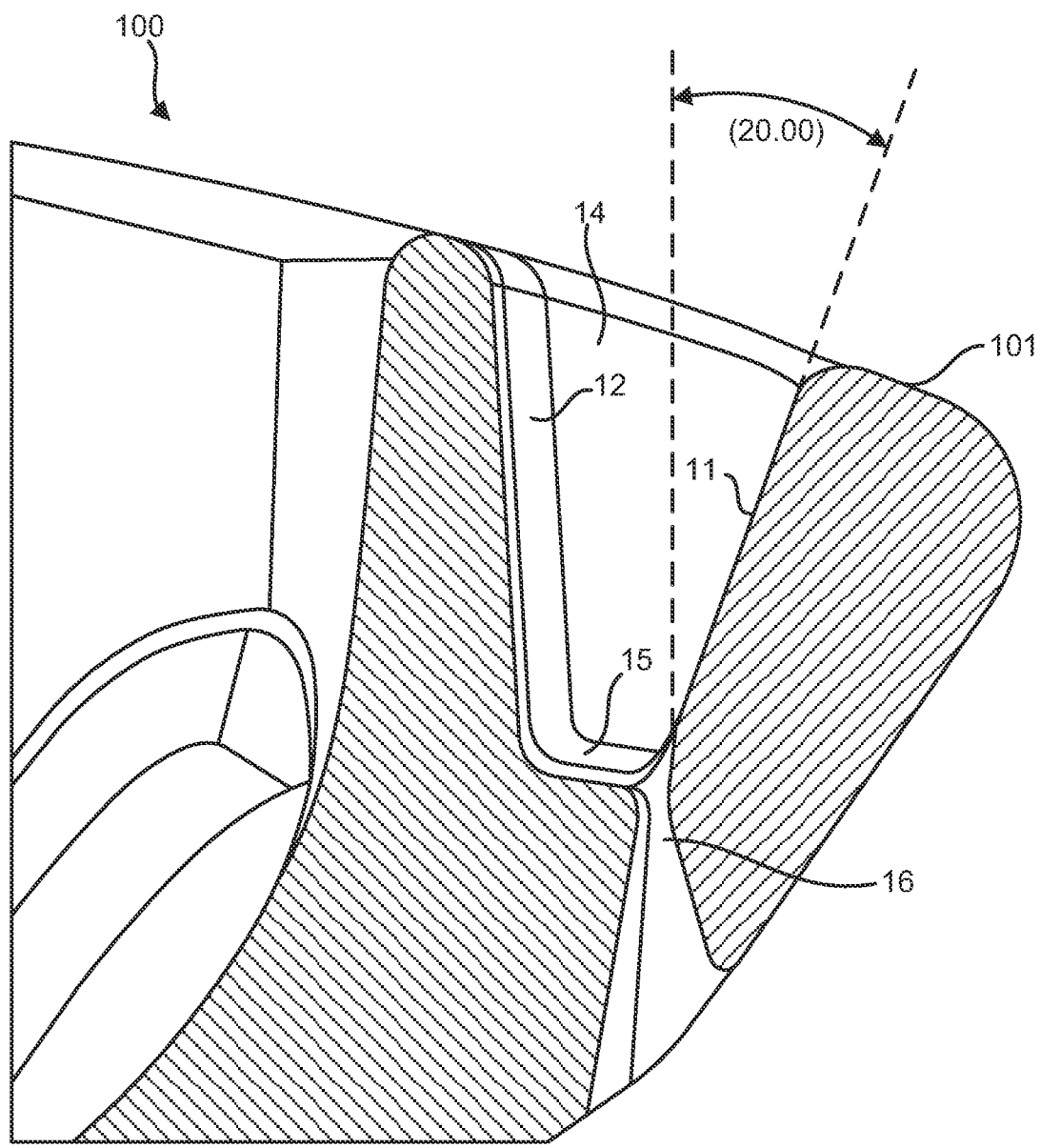
FIG. 3 is a cross-section of a portion of the swing seat shown in FIG. 1, showing an example configuration for the compartment.
Figure 4:
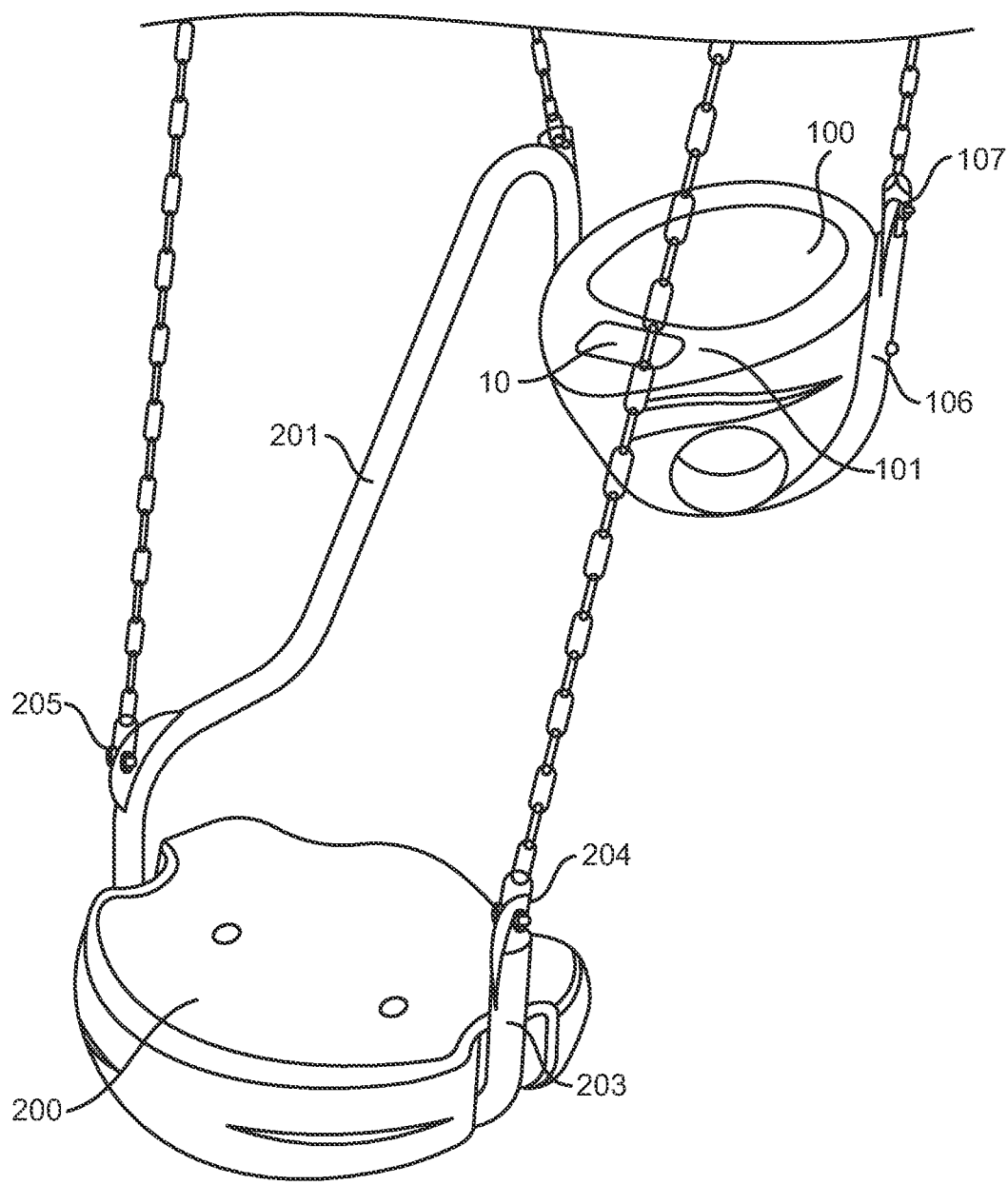
FIG. 4 is a front, right side perspective view of an embodiment of a swing having first and second seats, in which the first seat comprises a compartment configured to position a phone so as to take a photograph of the seat occupant during the swinging motion.
Figure 5:
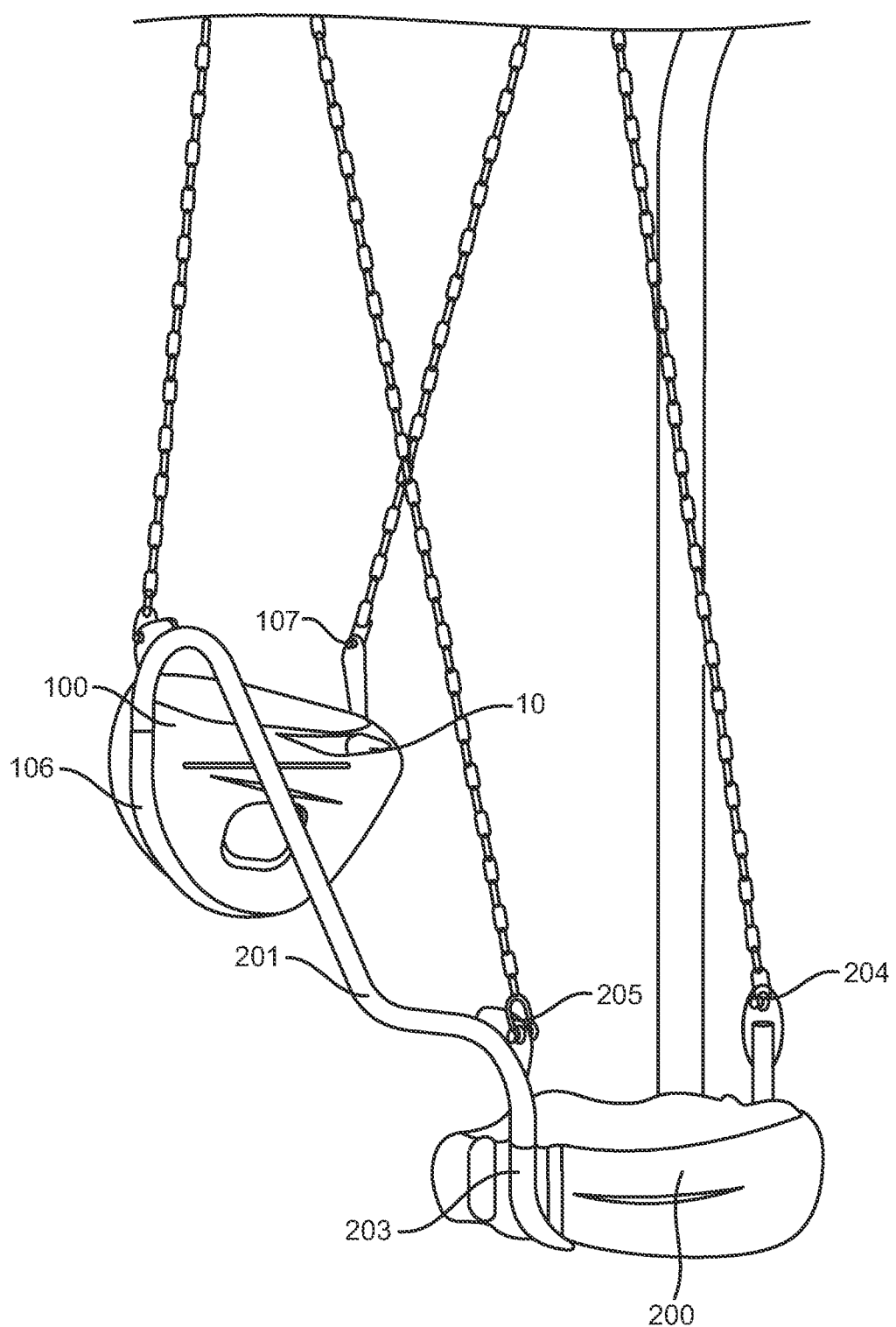
FIG. 5 is a front, left side perspective view of the swing shown in FIG. 4.
Figure 6:
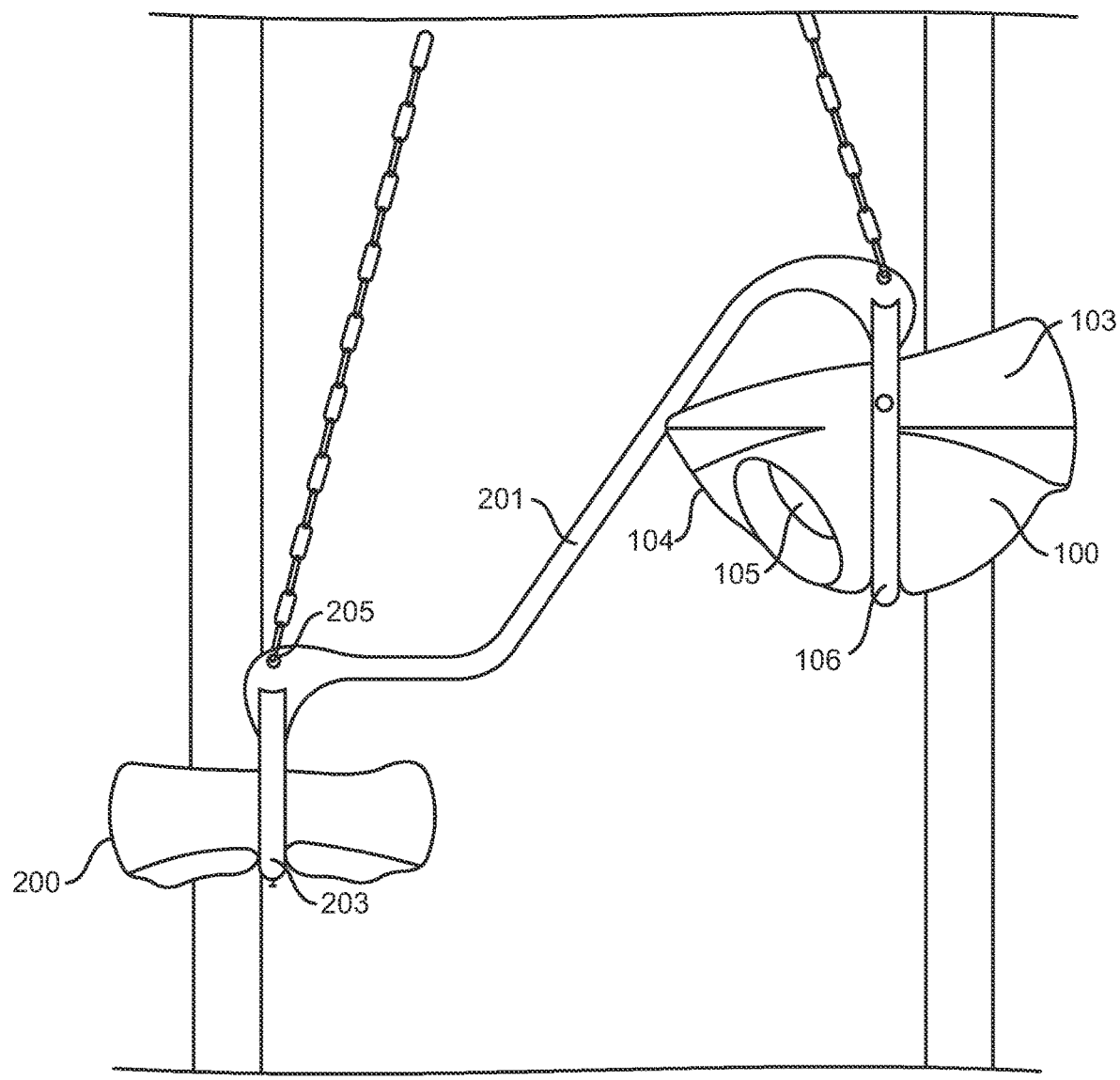
FIG. 6 is a right side elevation view of the swing shown in FIG. 4.

Embodiments of the present disclosure, including the embodiments shown in FIGS. 1 through 3, are directed to a swing seat 100 comprising a compartment 10, or aperture, that is sized and configured to hold a smartphone in place during the swinging motion. The compartment 10 is configured so that a user may place his/her phone into the aperture 10 and leave it there during the duration of a swinging activity. The aperture 10 is also positioned and configured to hold the smartphone at a location and angle to photograph at least the face of an occupant of the swing seat 100. Using a timer and/or a remote activator, a user may take a picture of the seat occupant enjoying the swinging activity. Alternatively, a user may take video of the seat occupant enjoying the swinging activity.

In some embodiments, the phone holding aperture 10 may be built directly into a swing seat 100. For instance, the embodiment illustrated in FIGS. 1 through 3 shows a child safety seat—e.g., a bucket seat—that is configured to include a phone-holding compartment 10, or aperture, at a substantially flat upper, front surface 101. In other, non-illustrated embodiments, the phone holding compartment 10 may be part of a separate support element connected to the swing seat 100.

In some embodiments, such as that illustrated in FIGS. 1 through 3, the swing seat 100 may be a child safety seat, e.g. a bucket seat, configured to safely seat an infant and/or toddler for swinging. The swing seat 100 may comprise at least a bottom surface 102, a back support 103, and a front support 104 defining a pair of leg holes 105. An example of such a swing seat 100 is shown in FIG. 1. The front support 104 may comprise a substantially flat upper surface 101 above the leg holes 105. The phone-holding compartment 10 may be located on this surface 101. As shown in the illustrated embodiment, the phone-holding compartment 10 may be an aperture, or hollowed-out portion of the front support 104. The phone-holding compartment 10 may be defined by a front (distal) wall 11, a rear (proximal) wall 12, a first side wall 13, a second side wall 14, and a bottom surface 15 (though in some embodiments, the walls may converge to a point at the bottom). It is accessible through the open top, into which a user may place a phone so that the phone sits at least partially inside the compartment 10.

Desirably, the compartment/aperture 10 is at least 2 inches deep in order to ensure that the phone is not caused to fall out of the swing by the swinging motion, alternatively at least 2.5 inches deep, alternatively at least 3 inches deep, alternatively at least 3.25 inches deep, alternatively at least 3.5 inches deep. In some embodiments, for instance, the compartment/aperture 10 may be between 2.5 inches and 4.5 inches deep, alternatively between 3 and 4 inches deep. In other embodiments, such as where the swing is expected to have a longer swing path (as is common for older children), the phone-holding compartment/aperture 10 may need to be deeper and/or include one or more additional phone securing elements. In some embodiments, the compartment/aperture 10 may be sized and configured so that the phone can be inserted and secured either vertically (for portrait-style photographs) or horizontally (for landscape-style photographs).

The compartment/aperture 10 is also desirably configured to position the phone at a slight upward angle, so that the camera will be directed at the seat occupant's face. For instance, the front, or distal, wall 11 of the compartment 10 may be angled so that the rear surface of the phone rests on the wall and the screen is angled slightly upward toward the seat occupant's face. This allows one to use the conventional "selfie" camera mode to take a picture of the seat occupant during the swinging activity. In some embodiment, the front wall 11 of the compartment 10 may be angled at least 5 degrees from vertical, alternatively at least 10 degrees from vertical, alternatively at least 15 degrees from vertical. For instance, in some embodiments, the front wall 11 of the compartment 10 may be angled between about 5 degrees and about 60 degrees relative to vertical, alternatively between about 10 degrees and about 45 degrees, alternatively between about 10 degrees and about 30 degrees, alternatively between about 15 degrees and about 25 degrees. The angling of the phone within the compartment 10 may be achieved in other manners as well, such as by the compartment having an angled bottom surface 15 and/or an angled rear wall 12.

Angling of the front wall 11, rear wall 12 and/or the bottom surface 15 may also provide additional benefits. Angling of the front wall 11 provides a surface on which the back of a smartphone may rest, helping to stabilize the phone within the compartment. Angling of the rear wall 12 away from the phone (toward the top of the compartment 10) may help prevent interference of the rear wall in any resulting photograph or video. Angling of the bottom surface 15 may help with drainage of the compartment 10, which prevents water from pooling in the compartment and potentially damaging an inserted smartphone. Each of these effects can be seen, for instance, in the embodiment illustrated in FIG. 3.

In some embodiments, the compartment 10 may include one or more drainage holes 16. The drainage hole(s) 16 allows for water, e.g. from rain and the like, to exit the compartment 10. The drainage hole(s) 16 may be located in the bottom surface 15 of the compartment 10. In some embodiments, such as that shown in FIG. 3, the drainage hole(s) 16 may be located at one end of the bottom surface 15 and the bottom surface may be angled downward toward the end containing the drainage hole(s) 16. For example, the bottom surface 15 may be angled downward toward the front wall 11 and the drainage hole(s) may be located where the front wall 11 and the bottom surface 15 meet. In other embodiments, a plurality of drainage holes 16 may be located at various locations across the bottom surface 15.

Figure 7:
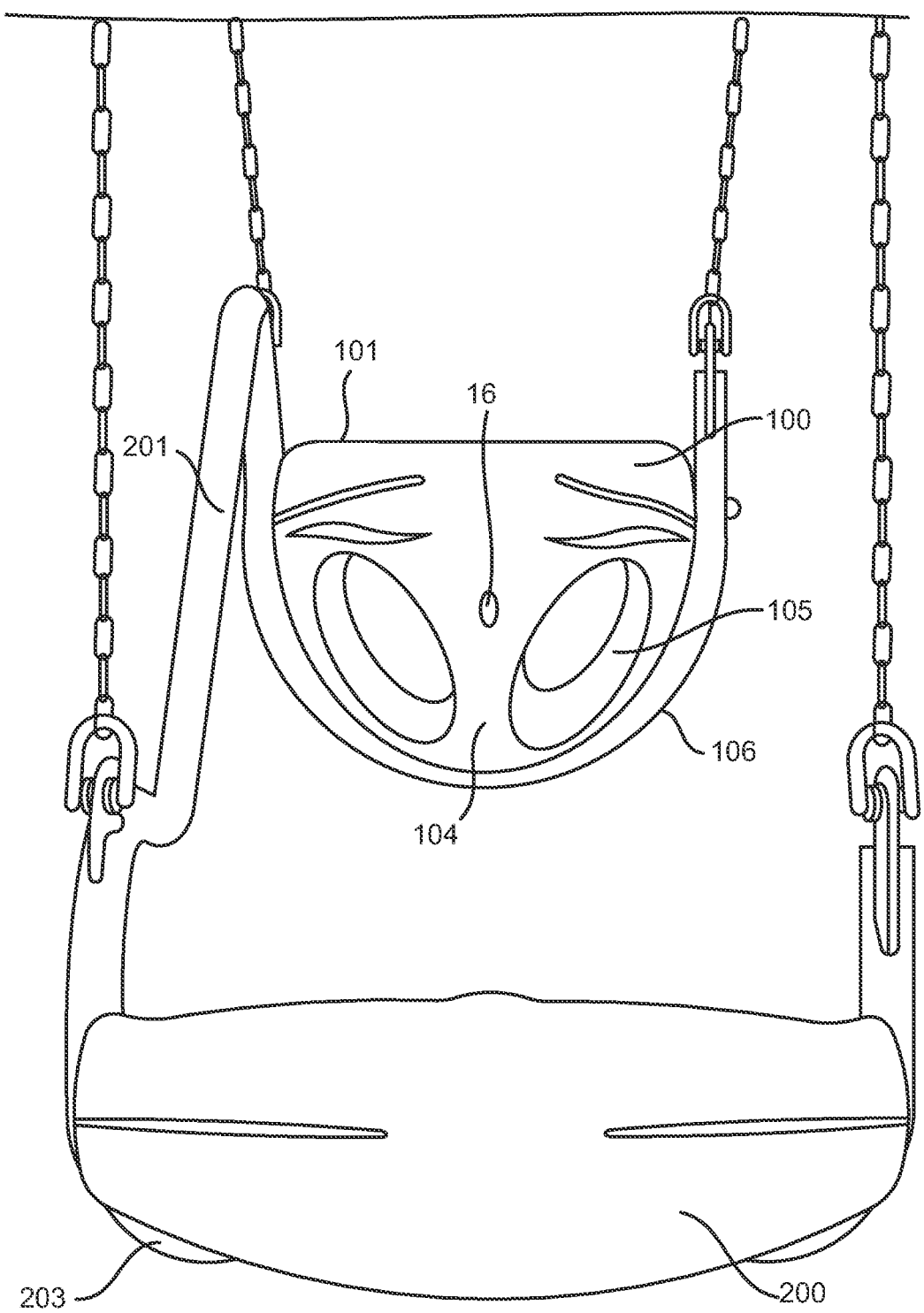
FIG. 7 is a front elevation view of the swing shown in FIG. 4.

The drainage hole(s) 16 preferably direct water that enters the compartment 10 away from an occupant of the swing seat 100. For instance, in the embodiment shown in FIG. 3, the drainage hole 16 drains through the front support surface 104 (as visible for example in FIG. 7). In other, non-illustrated, embodiments, the drainage hole(s) 16 may direct the water from the compartment 10 onto the bottom surface 102 of the seat 100 itself, after which the water may flow out of one or more seat drainage openings.

In some embodiments, the compartment 10 may include one or more phone securing elements. For instance, the compartment 10 may comprise one or more flexible tabs that are deformed or deflected when a phone is placed into the aperture. The tabs may press against the phone to provide additional securement of the phone in the aperture. As another example, the aperture may have a dimension, e.g. width between the front 11 and rear 12 walls, that narrows toward the bottom. In this way, a user may press a phone into the aperture to obtain a secure friction fit. Or, for example, one or more of the walls of the compartment 10 (e.g. the front wall 11) may be made out of a material that prevents slippage of the phone or may contain a friction-enhancing coating.

In some embodiments, the swing seat 100 may comprise one or more visual indicators 17 that indicate to a user that the compartment 10 is meant to hold a smartphone at a position for the taking of photographs and/or video of the seat occupant. An example of such an indicator 17 is shown in FIGS. 1 and 2. In some embodiments, including the illustrated embodiment, the visual indicator 17 may be positioned on the surface adjacent to the compartment 10, such as on substantially flat upper surface 101. In other embodiments, the visual indicator 17 may be placed on a wall of the compartment, such as on front wall 11. The visual indicator 17 may desirably be integral with, e.g. molded or stamped into, the material that makes up the compartment walls or the surrounding structure, such as is shown in the illustrated embodiment. However, the application of a visual indicator 17 using a sticker, adhesive, or the like is also contemplated. The visual indicator 17 may also have any design, so long as the design provides a user with some indication of the intended use of the compartment 10.

In some embodiments, the swing seat 100 may be configured to seat an older child and/or an adult. For instance, the seating surface of the swing seat 100 may be a board seat, belt seat, chair seat, bench seat, or the like. The swing seat 100 may include a phone support element that is connected to the seating surface so as to have a common swinging motion. Desirably, the phone support element is positioned to provide a good angle for a photograph of the seat occupant without interfering with either the accessibility of the seating surface or the swinging activity itself. For instance, the phone support element may desirably be located in front of the seating surface, either centrally or offset to one side, in order to easily and comfortably obtain quality photographs of the seat occupant. In other embodiments, however, the phone support element may be located to the side of the seating surface instead of in front of the seating surface (requiring a user to look sideways for a face-on photo).

The phone support element may be connected to the seating surface in a variety of different manners, keeping in mind the need to maintain easy access into and out of the seat. In some embodiments, the swing seat 100 may comprise a connector that extends underneath the seating surface, such that a user can step over the connector when entering the seat. For instance, the connector may extend forward from the bottom of the seating surface to a desired distance in front of the seat and then upward to position the phone support element at a desirable photograph-taking height. In other embodiments, the swing seat 100 may comprise a connector that extends forward along one side of the swing seat, such that a user can enter the seat through the opposite side. For example, the connector may extend from an armrest or a backrest of the seat. In yet other embodiments, the swing seat may comprise a connector that extends over the top of a seat occupant.

As one example, instead of seat 200 being connected to seat 100 by connector 201, such as is shown in FIGS. 4 through 7, a similar connector element may link seat 200 to a phone support element which may be positioned and configured to take photographs and/or video of the occupant of seat 200.

In some embodiments, the swing seat 100 may have a plurality of phone-holding compartments 10 and/or phone support elements. For instance, a swing seat 100 may have phone-holding compartments 10 and/or phone support elements at varying heights and/or distances to provide photographs from different perspectives.

The swing seat 100 shown in FIGS. 1 through 3 may be suspended from a support structure to provide an independent child swing. Swing seat 100 may be suspended in any conventional manner as would be understood by persons of skill in the art. For instance, the swing seat 100 may comprise suspension points, such as at each side of the seat, to which one or more chains may be attached and used to suspend the seat from a support structure. In some embodiments, those suspension points may be provided by a U-shaped framework 106 that extends below the lower support surface 102 and up around the sides of the child safety seat 100. An example of such a U-shaped framework 106 is shown in FIGS. 4 through 7 (although the U-shaped framework shown in those figures is attached to a connector element 201 that links seat 100 with a second swing seat 200). The U-shaped framework 106 may be affixed to the child safety seat 100 in any conventional manner, as would be understood by those of skill in the art. The U-shaped framework 106 may comprise suspension points 107, such as at each end of the framework, to which one or more chains may be attached and used to suspend the swing seat 100 from a support structure.

In some embodiments, instead of operating as an independent child swing, the swing seat 100 may be connected to a second swing seat 200 such that the two swing seats share a common swinging motion. In the embodiment illustrated in FIGS. 1 through 4, for instance, the swing may comprise a first seat 100 and a second seat 200 that are connected together to share a swinging motion. In the illustrated embodiment, seat 100 is a child safety seat comprising a phone holder 10 that is integrated into the seat itself, as described above and seat 200 is an adult seat.

The type, shape, and style of the seats 100, 200 may also vary from that shown in the illustrated embodiment. For instance, in some embodiments, both seats 100, 200 may be configured for older children and adults and may include board seats, belt seats, chair seats, bench seats, or the like. Or both seats may be configured for infants and/or toddlers and may include child safety seats such as bucket seats. In some embodiments, for instance, both the first seat 100 and the second seat 200 may be child safety seats such as that shown in FIGS. 1-3. Further, although the first seat 100 and the second seat 200 are shown as being vertically displaced from one another in FIGS. 4-7, the first seat 100 and the second seat 200 may be positioned at the same or substantially the same vertical height, particularly where the first seat 100 and the second seat 200 are each a child safety seat such as that shown in FIGS. 1-3.

First seat 100 and second seat 200 may be connected to one another by a connector 201. The connector may take on any of a variety of configurations, so long as it connects the first and second seats in a horizontally spaced apart manner. In the illustrated embodiment, for example, the connector 201 comprises a piped framework that extends between the seats along a first side of the first and second swing seats. In other embodiments, however, the connector 201 may comprise a piped framework that extends between the seats below the first and second seats 100, 200. In yet other embodiments, the connector 201 need not be a piped framework at all. Instead, the connector 201 may be a molded plastic structure. For instance, the first and second seats 100, 200 may made of plastic and be integrally formed with a plastic connector 201. As with the piped framework connector 201, the plastic connector may be positioned to one side of the first and second seats 100, 200, below the first and second seats, or a combination thereof. The plastic connector 201 also may or may not be reinforced, such as with a piped framework portion.

The connector 201 may also be attached to the first and second seats 100, 200 in any known manner. In the illustrated embodiment, for example, the connector 201 may be affixed to, or integral with, U-shaped framework 106 which supports first seat 100. Further, the connector 201 may be affixed to, or integral with, a U-shaped framework 203 which supports second seat 200. As illustrated, the U-shaped framework 106 supporting the first seat 100 and the U-shaped framework 203 supporting second seat 200 each includes one or more suspension points 107, 204. The connector 201 may also include one or more suspension points 205. In other embodiments, such as where the connector 201 is a plastic connector and/or where the connector extends below the first and second seats 100, 200, the suspension points may be located on each of the first and second seats.

In some embodiments, the first seat 100 and the second seat 200 may be vertically displaced, such that the first seat is positioned higher than the second seat. For instance, the first seat 100 and second seat 200 may be arranged such that an adult and a child face one another and share a common eye level. Taking into account the height differential of the adult and the child, the second seat 200 may be vertically disposed a distance below the first seat 100. Preferably, the vertical distance between the first seat 100 and the second seat 200 is between about six inches and sixteen inches, alternatively between about eight and about fourteen inches, alternatively between about nine and about thirteen inches, alternatively between about ten and about twelve inches. Given the average height of an adult and child, the ranges of vertical displacement will provide a common eye level for most caretakers and children. In other embodiments, the first and second seats 100, 200 may be positioned at the same height or substantially the same height.

In some embodiments, the swing comprising a first seat 100 and a second seat 200 may comprise multiple phone holders 10, such that a first can be used to photograph the occupant of the first seat and a second can be used to photograph the occupant of the second seat. Alternatively, the swing may include a single phone holder 10 than can be used in different ways in order to photograph either the occupant of the first seat 100 or the occupant of the second seat 200. For instance, one wall or surface of the compartment 10 (e.g. front wall 11) may be angled to support the phone in an orientation to photograph the occupant of the first seat 100 and another wall or surface of the compartment (e.g. rear wall 12) may be angled to support the phone in an orientation to photograph the occupant of the second seat 200. In other embodiments, a phone holder may only operate to photograph the occupant of one of the first and second seats 100, 200.

Whirls

In another set of embodiments, the playground apparatus is a whirl, also sometimes referred to as a Merry Go Round.

Embodiments of the present disclosure, including the embodiments shown in FIGS. 8 through 17, are directed to a whirl 300 comprising one or more compartments 10, each of which is sized and configured to hold a smartphone in place during spinning motion of the whirl. Each compartment 10 is configured so that a user may place his/her phone into the compartment 10 and leave it there during the duration of a spinning activity. The compartment 10 is also positioned and configured to hold the smartphone at a location and angle to photograph at least the face of an occupant of the whirl 300. Using a timer and/or a remote activator, a user may take a picture of the occupant enjoying the spinning activity. Alternatively, a user may take video of the occupant enjoying the spinning activity.

The whirl 300 may take on any of a variety of configurations. In general, a whirl 300 is a playground component having a base 301 that is configured to spin about a central mount. The base 301 is typically large enough to hold multiple children, each of whom sits or stands on the base, depending on whether or not the base comprises one or more seats, one or more handles, or a combination thereof. In the illustrated embodiments, for example, the base 301 comprises a plurality of seats 302. In other (non-illustrated) embodiments, however, the whirl 300 may not contain seats. For example, in some embodiments, the whirl 300 may instead include one or more handles that may be grasped by a user and held onto during the spinning motion. In yet other embodiments, a whirl 300 may comprise a combination of one or more seats and one or more handles. The seats 302 and/or handles may be integral with the base 302, such as shown in the illustrated embodiment, or may be separate components that are affixed to the base.

Some whirls 300 may also have one or more flat or substantially flat surfaces on which a child in a wheelchair may enjoy the whirl. In some embodiments, the mount for these "inclusive play" whirls may also be sunk into the ground so that the upper surface of the base 301 is substantially level with a play surface instead of elevated above the play surface as is the case with a typical whirl. In these embodiments, one or more phone-holder compartment 10 may be oriented so that a user of a wheelchair positioned on that surface may be the subject of a photograph and/or video.

Figure 8:
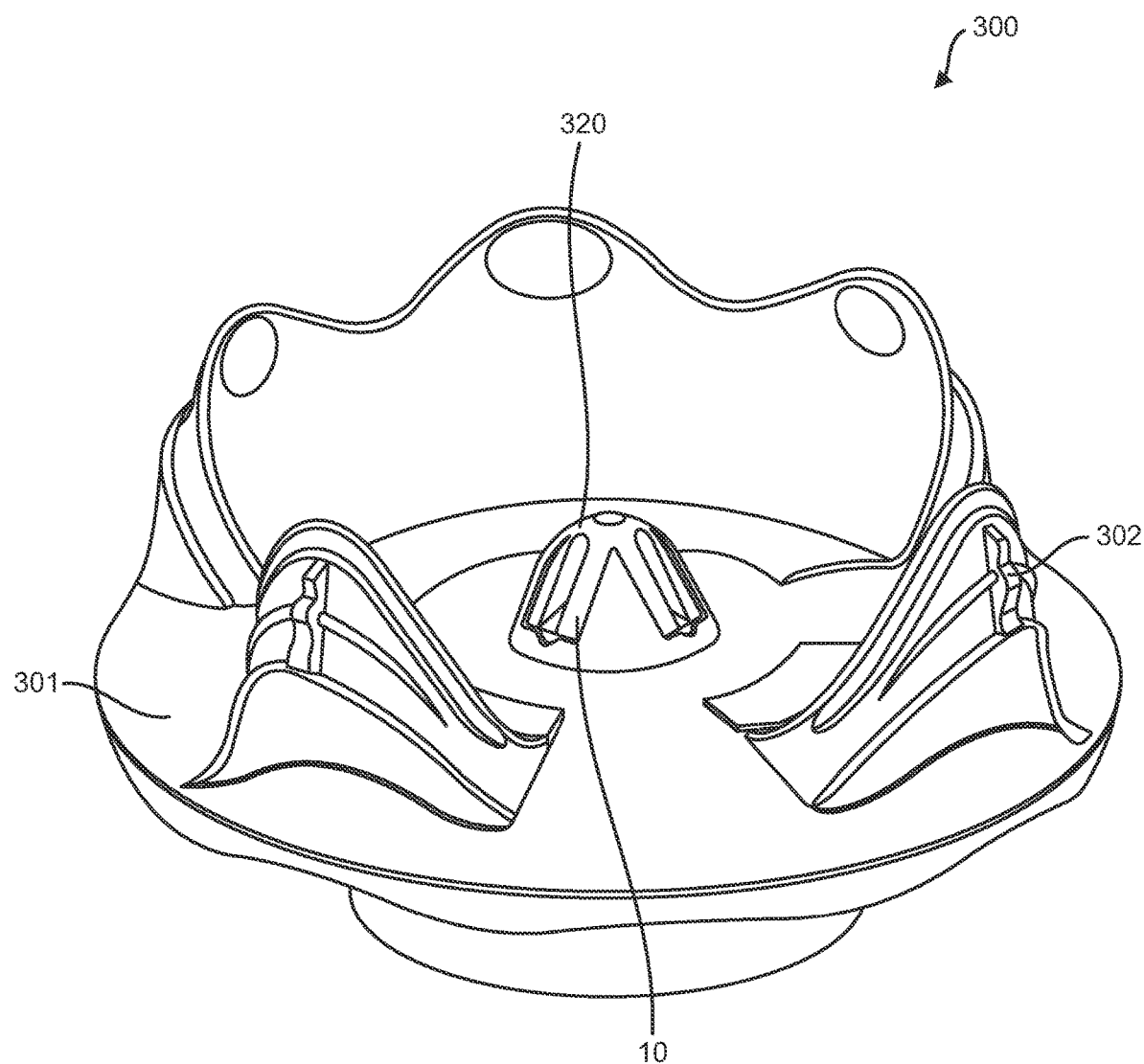
FIG. 8 is a perspective view of a first embodiment of a whirl having a plurality of phone holders, each of which is configured to position a phone so as to take a photograph of a seat occupant during operation of the whirl.

A first embodiment of a whirl 300 is shown in FIG. 8. For the embodiment shown in FIG. 8, one or more children may spin the whirl 300 by holding onto any portion of the base 301 and running in a circular motion. Once the whirl is spinning, the one or more children may jump onto the base 301 and maneuver into the plurality of seats 302. Alternatively, by pushing any portion of the base 301, a caretaker (or a child that does not him/herself get onto the base 301) may initiate spinning of the whirl 300 and/or maintain a spinning motion for other children, each of whom may remain in one of the seats 302.

Figure 9:
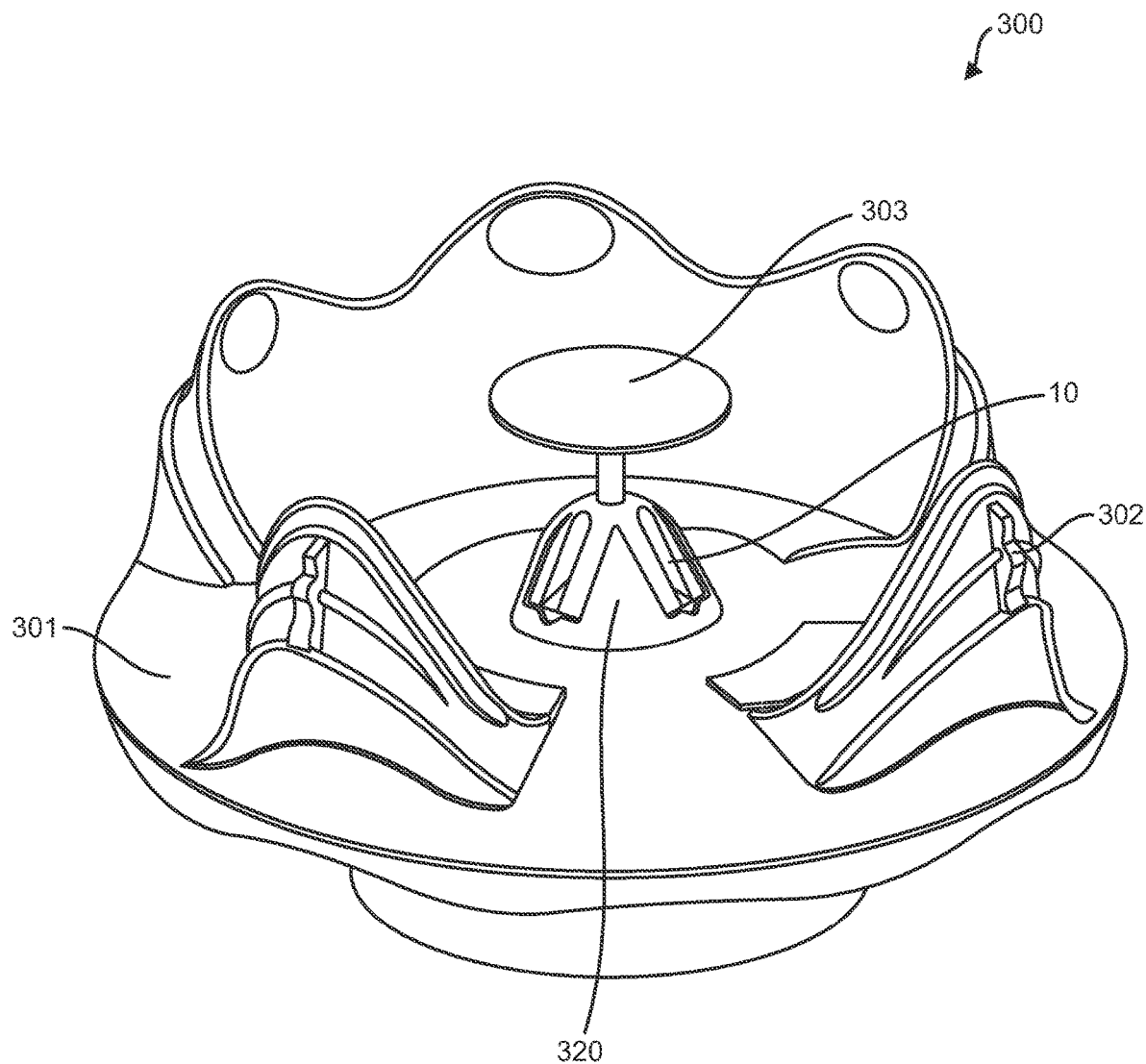
FIG. 9 is a perspective view of a second embodiment of a whirl having a plurality of phone holders, each of which is configured to position a phone so as to take a photograph of a seat occupant during operation of the whirl.
Figure 10:
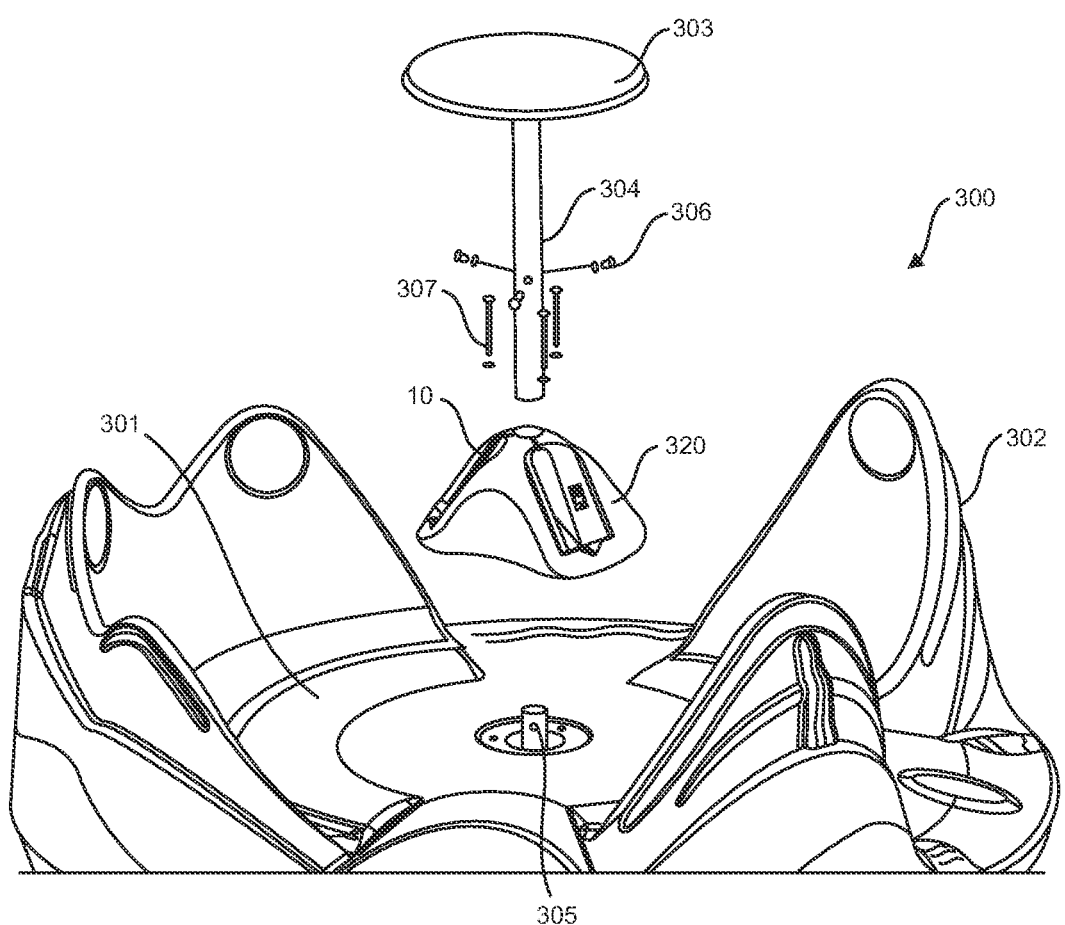
FIG. 10 is an exploded perspective view of the whirl shown in FIG. 9.

A second embodiment of a whirl 300 is shown in FIGS. 9 and 10. The embodiment shown in FIGS. 9 and 10 differs from the embodiment shown in FIG. 8 in that it further comprises a central handle 303 by which one or more children may initiate spinning of the whirl 300 and/or maintain a spinning motion without having to step off of the base 301. To do so, one or more children occupants of the plurality of seats 302 may simply push off from the central handle 303. The central handle 303 extends from a central shaft 304 that is fixedly attached to a support post 305. Whirls 300 of this sort are sometimes referred to as tea cup whirls or as spinning tea cups (based off of their being operated similarly to the popular amusement park ride).

The whirl 300 may be rotatably mounted to a support structure by any conventional manner, as would be understood by persons of skill in the art. The support structure is generally concealed below the base 301, which extends outward beyond the support structure.

In some embodiments, the one or more phone holding compartments 10 may be built directly into the base 301 of the whirl 300. For example, a compartment 10 may be integral with the base 301. In such an embodiment, the base 301 would typically include an upward protruding feature that would contain the compartment 10, although the compartment could also be incorporated into the floor of the base. In other embodiments, including the illustrated embodiments, the one or more phone holding compartments 10 may be part of a separate support element 320 that is connected to the base 301 of the whirl 300. Support element 320 may be configured so that it can be installed onto existing whirl 300 as well as included as part of a new whirl. Support element 320 desirably extends above the base 301, thereby elevating the one or more compartments 10 above the floor of the base 301. Support element 320 may be a one-piece unit or may be made up of multiple pieces.

In yet other embodiments, the handle 303 or the central shaft 304 may comprise one or more phone-holding compartments 10, such that a user could take a video of a plurality of children spinning around a fixed camera.

The one or more phone-holding compartments 10 are desirably located at or near the center of the base 301.

For instance, support element 320 may be positioned so as to surround a central axis of the whirl 300. In some embodiments, such as that shown in FIGS. 9-10, the support element 320 may be configured to surround at least a portion of central shaft 304. This may provide the additional benefit of concealing and restricting access to the one or more fasteners 306, e.g. bolts, that secure central shaft 304 to support post 305. This protects fasteners 306 from environmental degradation and prevents tampering with those fasteners, loosening of those fasteners, and the like. Support element 320 may therefore comprise a central aperture 310 through which a portion of the central shaft 304 may extend. When affixed to a whirl 300 that does not utilize a central handle 303, such as the whirl shown in FIG. 8, central shaft 304 may be closed off by a cap.

In other embodiments, support element 320 need not surround the central axis of the whirl 300 but may instead be located on one side of the central axis. For instance, support element 320 may only contain a single phone-holder compartment 10 and may thus only comprise one third of the structure shown in the illustrated embodiments. Or support element 320 may contain only two phone-holder compartments 10. In some embodiments, whirl 300 may comprise multiple support elements 320, each of which may contain one or more phone-holder compartments 10. The multiple support elements 320 may be located at positions around the central axis so as orient each of the phone-holder compartments 10 toward one or more seats 302 or handles.

Support element 320 may be secured to the base 301 using one or more fasteners 307, e.g. bolts. In some embodiments, the support element 302 and/or the one or more phone-holding compartments 10 present on the support element may be configured to restrict access to fasteners 307. For example, support element 320 may comprise one or more through-holes 308 configured to receive the one or more fasteners 307 and at least one of the through-holes, and desirably each of a plurality of through-holes, may be positioned such that access to the fastener is restricted. For example, the through-hole 308 may be positioned within a recess 309 that is difficult to access by hand. In some embodiments, including for example the illustrated embodiments, the recess 309 may extend inward from the phone support wall 11.

The recess 309 may comprise a flat or substantially flat bottom surface or, as in the illustrated embodiments, the recess 309 may comprise an angled surface that provides for drainage of water (e.g. rain) away from the fastener 307. When the recess 309 extends inward from the phone support wall 11, the angled surface of the recess may operate in association with the one or more drainage holes 16 of the phone-holding compartment 10 (e.g. water may flow down the angled surface and then out of the one or more drainage holes).

The phone-holding compartment 10 may comprise at least a phone support surface, or wall, 11 and a bottom surface, or ledge 15. At least the phone support surface 11 is desirably angled so that a smartphone placed in the compartment 10 is angled toward the face of an occupant of the whirl 300. In the illustrated embodiments, for example, phone support surface 11 is angled upward.

The particular angle of the phone support surface 11 will depend on the elevation of the compartment 10 above the base 301. Where the compartment 10 is positioned a small distance above the base 301, for example, the phone support wall 11 may be angled between about 5 degrees and about 60 degrees from vertical, alternatively between about 10 degrees and about 60 degrees from vertical, alternatively between about 15 degrees and about 50 degrees from vertical, alternatively between about 15 degrees and about 45 degrees from vertical, alternatively between about 20 degrees and about 45 degrees from vertical, alternatively between about 25 and about 40 degrees from vertical, alternatively between about 30 and about 40 degrees from vertical.

The bottom ledge 15 may also be angled upward away from the phone support surface 11 so as to prevent a phone from sliding out of the phone-holding compartment 10. In some embodiments, for example, the bottom ledge 15 may be angled between about 5 degrees and about 60 degrees from horizontal, alternatively between about 5 degrees and about 50 degrees from horizontal, alternatively between about 10 degrees and about 50 degrees from horizontal, alternatively between about 15 degrees and about 45 degrees from horizontal, alternatively between about 20 degrees and about 45 degrees from horizontal, alternatively between about 25 and about 40 degrees from horizontal, alternatively between about 30 and about 40 degrees from horizontal. As illustrated, the bottom ledge 15 may form a right angle with the phone support surface 11.

The bottom ledge 15 may also have a depth that is configured to prevent a phone from falling out of the phone-holding compartment 10 during use of the whirl 300. For instance, the bottom ledge may be at least ½ inch deep, more desirably at least 1 inch deep.

The phone-holding compartment 10 may also comprise one or more drainage tracks 16. The drainage track(s) 16 allows for water, e.g. from rain and the like, to exit the compartment 10. The drainage track(s) 16 may be located in the bottom surface 15 of the compartment 10. In some embodiments, such as that shown in the illustrated embodiments, a drainage track 16 may be located at or near the center of the bottom surface 15 and each side of the bottom surface may be angled downward toward the central point containing the drainage track. In other embodiments, a plurality of drainage tracks 16 may be located at various locations across the bottom surface 15, such as at each corner of the compartment 10 for example.

Figure 13:
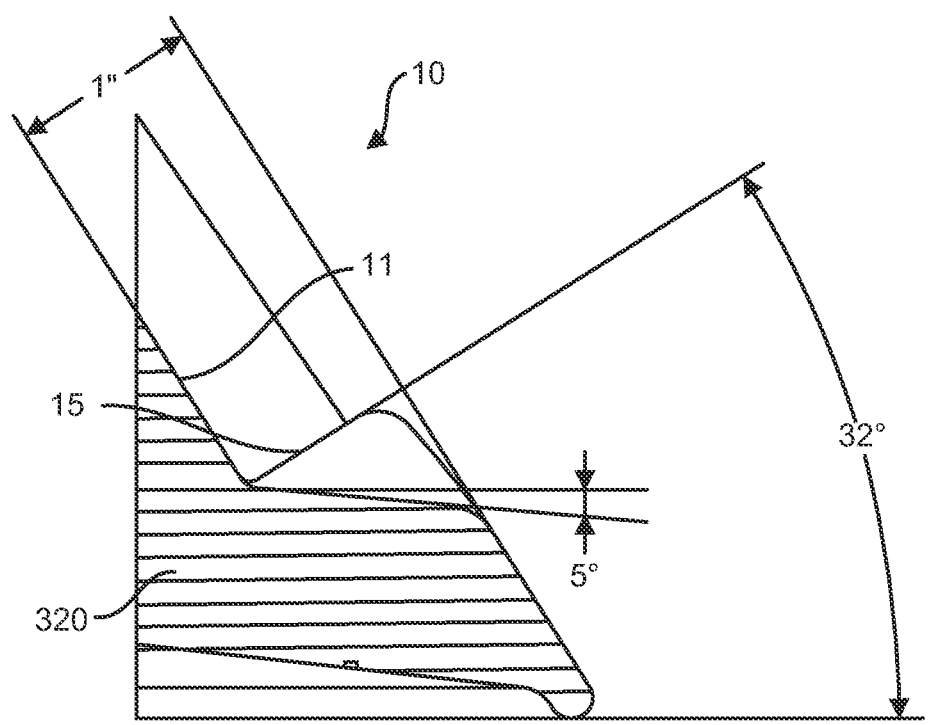
FIG. 13 is a cross-sectional view of a portion of the phone support element shown in FIG. 12, taken along line AA.

As shown in the illustrated embodiments, each of the one or more drainage track(s) 16 may be angled downward to allow for water to run out of the phone-holding compartment and onto the base 301 of the whirl. For instance, the embodiment of a phone-holding compartment 10 shown in FIG. 13 is illustrated as having a drainage track that is angled downward at an angle of 5 degrees.

Figure 14:
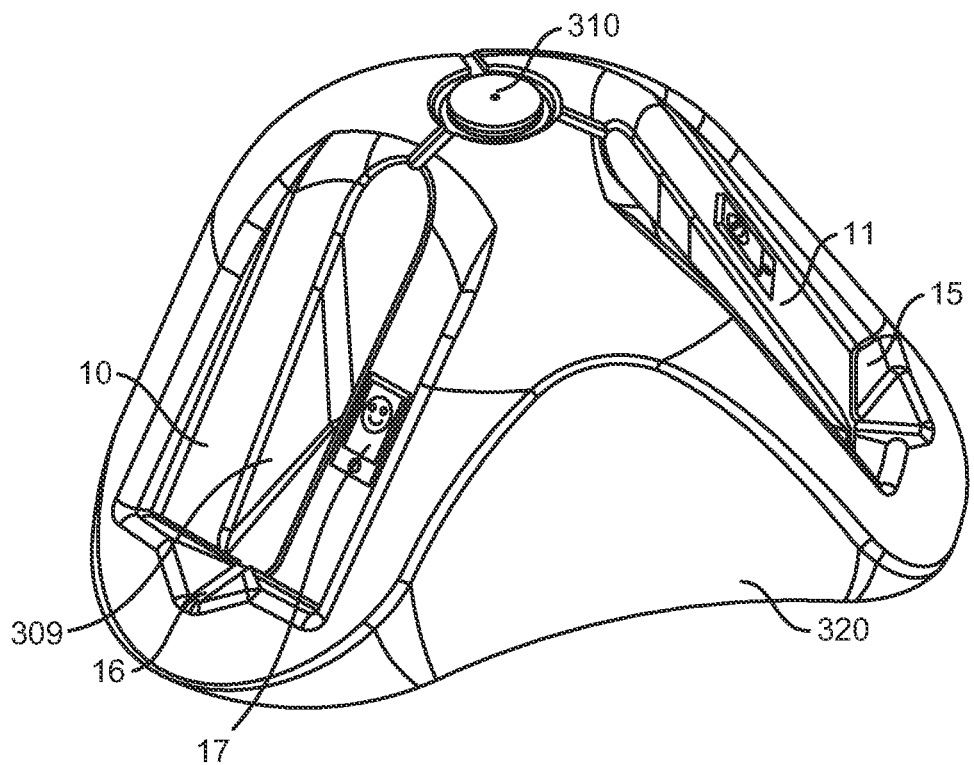
FIG. 14 is a perspective view of a second embodiment of a phone support element configured to be attached to the base of a whirl.
Figure 15:
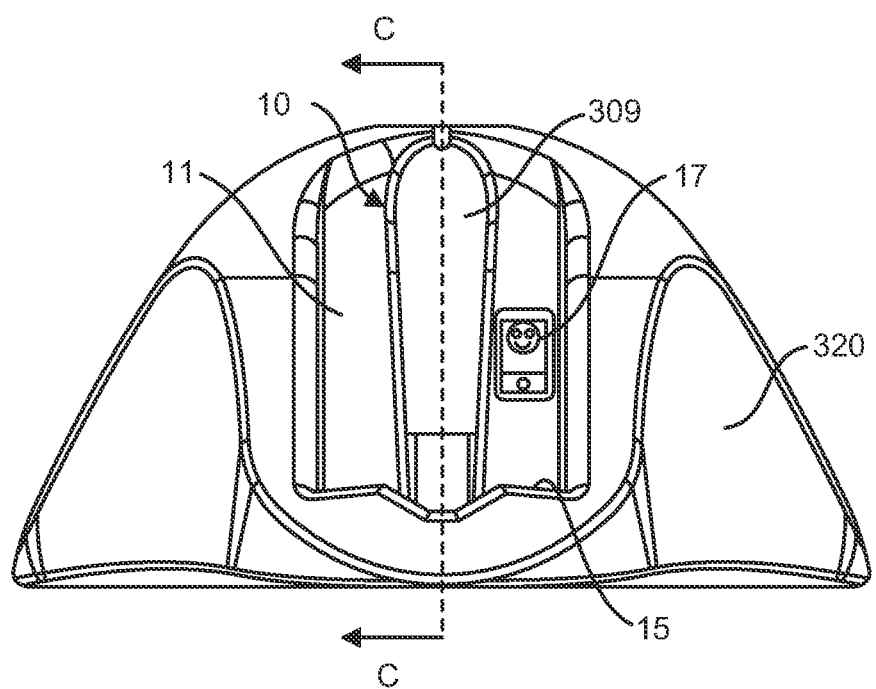
FIG. 15 is a front elevation view of the phone support element shown in FIG. 14.
Figure 16:
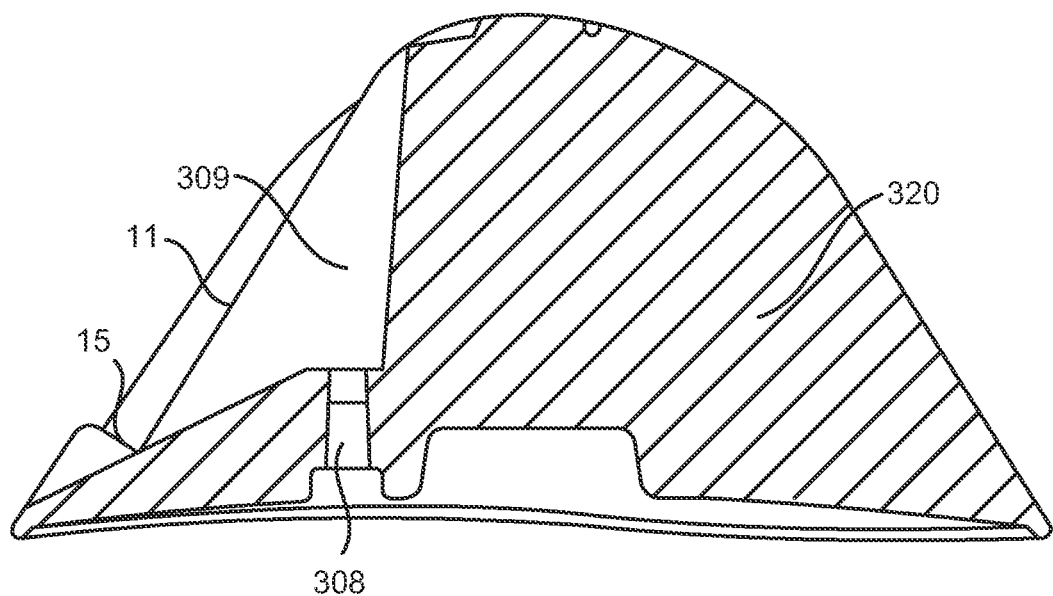
FIG. 16 is a cross-sectional view of the phone support element shown in FIG. 15, taken along line CC.

The bottom surface 15 may be divided into a plurality of sections by the one or more drainage tracks 16. As shown in FIG. 14, for instance, the bottom ledge 15 may be split to left and right sections by a central drainage divot 16. Regardless of the drainage divot 16, however, the bottom ledge 15 is configured so that the bottom edge of a phone rests on and is supported by the ledge.

In other embodiments, the phone-holding compartment 10 may comprise one or more drainage through-holes (as opposed to tracks), such that water flows down through the support element 320 and/or base 301 and ends up underneath the whirl 300.

In some embodiments, the compartment 10 may include one or more phone securing elements. For instance, the compartment 10 may comprise one or more flexible tabs that are deformed or deflected when a phone is placed into the compartment. The tabs may press against the phone to provide additional securement of the phone in the compartment. As another example, the compartment may have a dimension that provides for a friction fit with an inserted phone. Or, for example, the phone support wall 11 may be made out of a material that prevents slippage of the phone or may contain a friction-enhancing coating.

Figure 11:
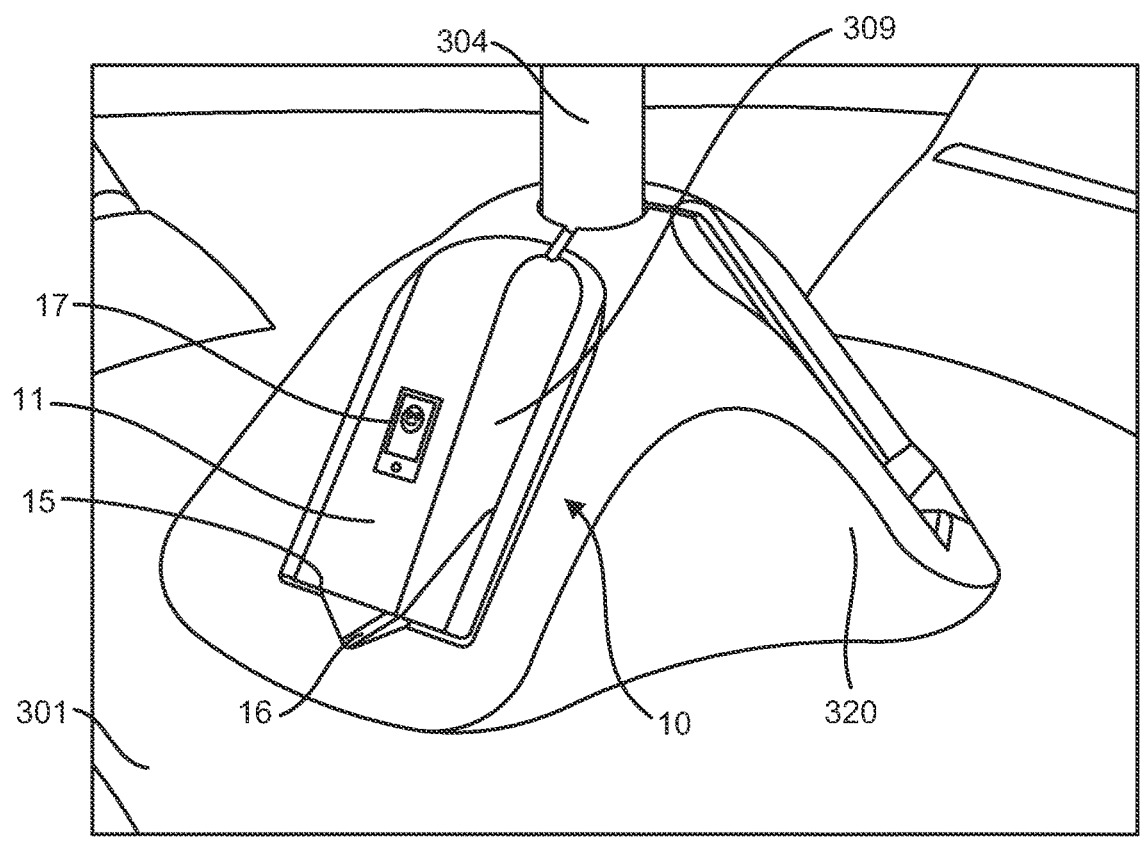
FIG. 11 is a perspective view of a first embodiment of a phone support element attached to the base of a whirl.
Figure 12:
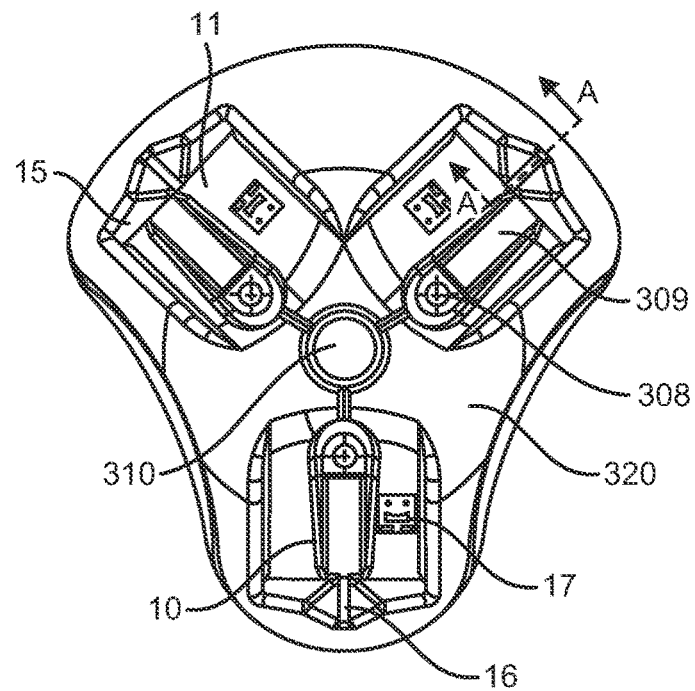
FIG. 12 is a top plan view of the phone support element shown in FIG. 11.

The whirl 300 may also comprise a visual indicator 17 that indicate to a user that the one or more compartments 10 are for holding a smartphone to take a photograph and/or video of an occupant of the whirl. An example of such an indicator 17 is shown in FIG. 11. The visual indicator 17 may be located anywhere on the whirl, including for example on the base 301 or on support element 320. In the illustrated embodiments, visual indicator 17 is located on the phone support wall 11 of each compartment 10. However, the visual indicator 17 could just as easily be located elsewhere on the support element 320, such as adjacent to each compartment 10. The visual indicator 17 may desirably be integral with, e.g. molded or stamped into, the material that makes up the support element 320, such as is shown in the illustrated embodiment. However, the application of a visual indicator 17 using a sticker, adhesive, or the like is also contemplated. The visual indicator 17 may also have any design, so long as the design provides a user with some indication of the intended use of the compartment 10.

Figure 17:
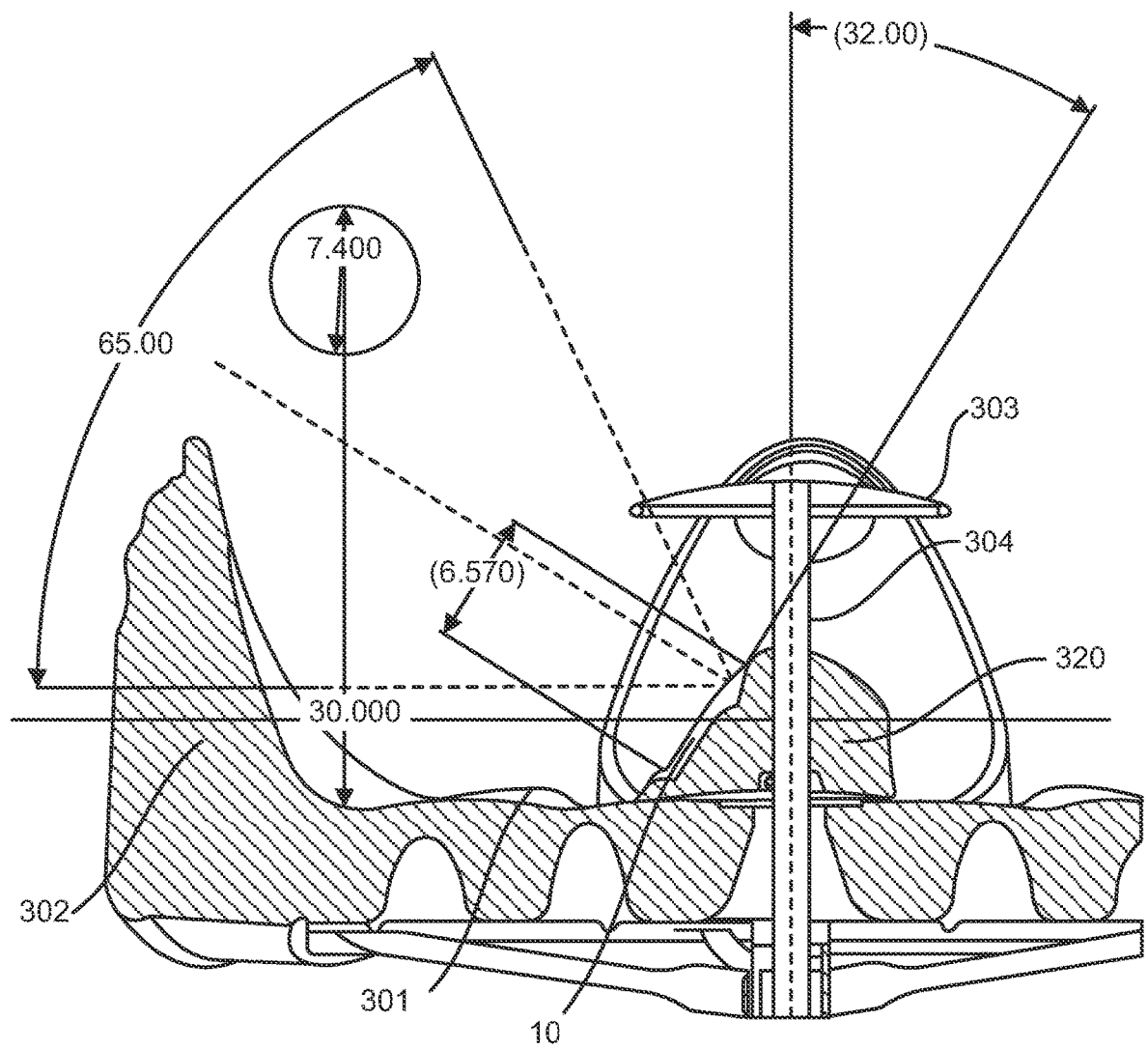
FIG. 17 is a cross-sectional view of a portion of the whirl shown in FIG. 9, showing a configuration of the phone holder such that an average smartphone camera will capture the face of a 50th percentile twelve-year-old child occupant.
Figure 18:
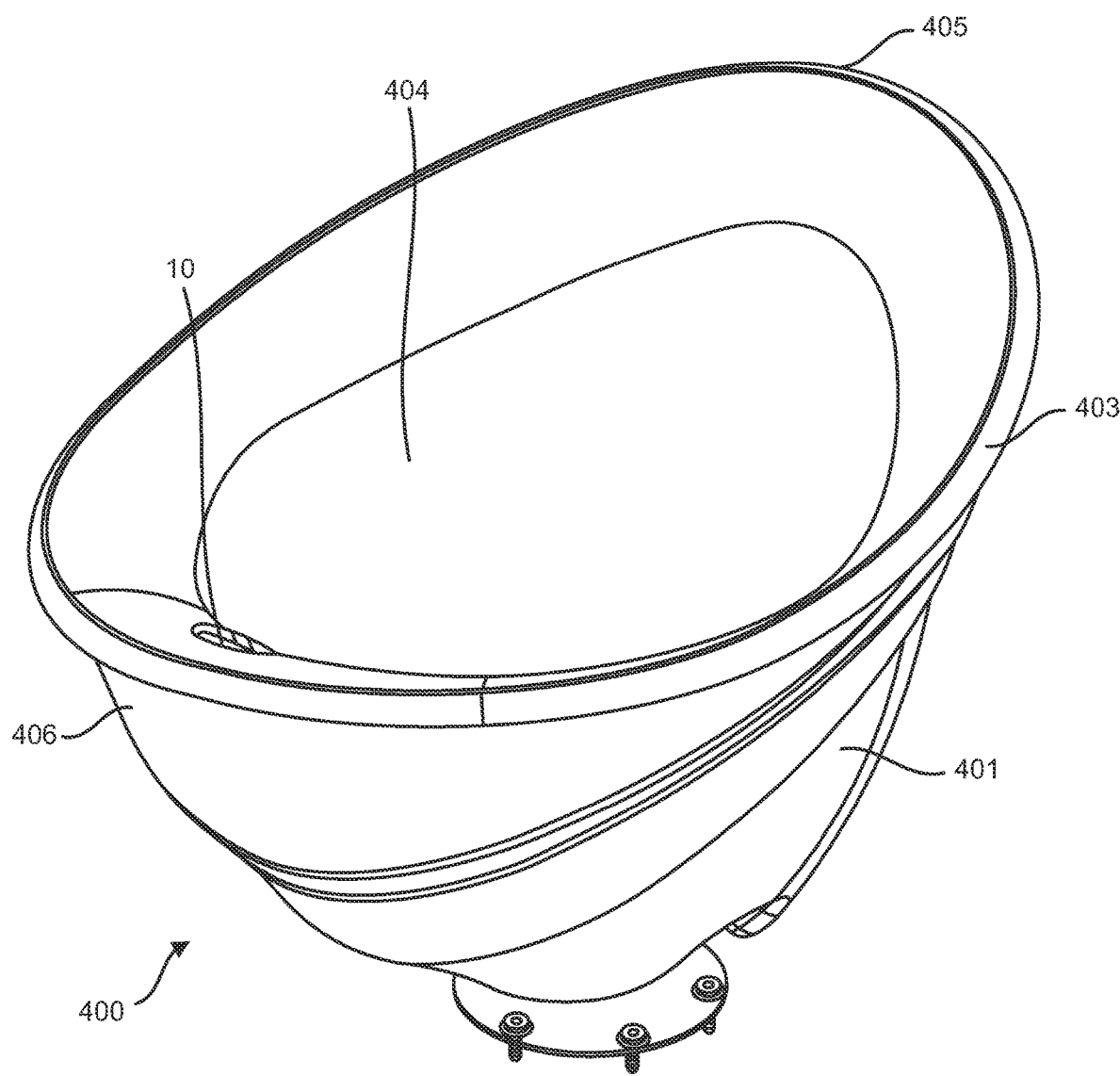
FIG. 18 is a front perspective view of a first embodiment of a spinner having a phone holder configured to position a phone so as to take a photograph of a seat occupant during operation of the spinner.
Figure 19:
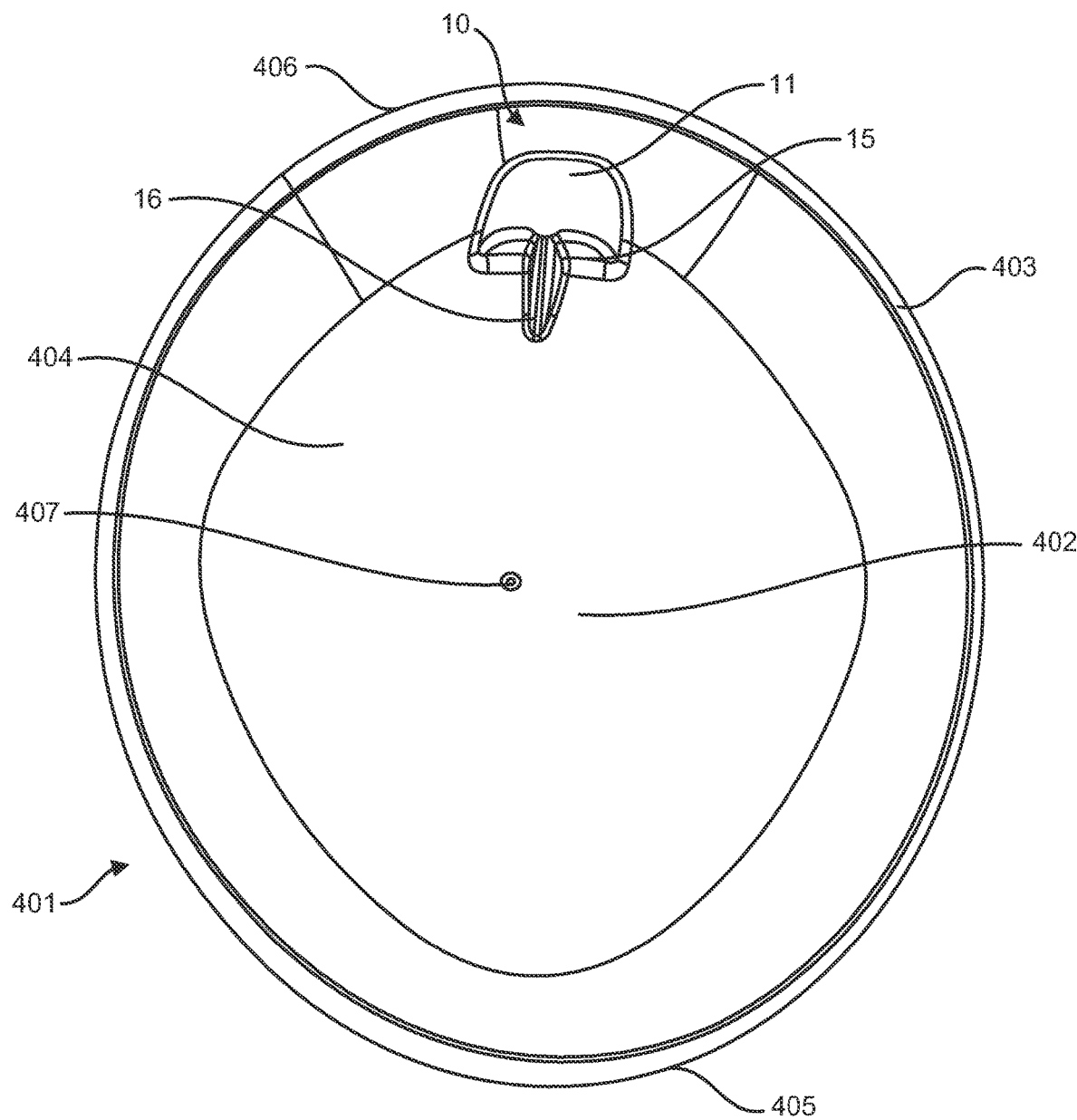
FIG. 19 is a top plan view of the spinner shown in FIG. 18.

In some embodiments, the phone-holder compartment 10 may be positioned at a height and angle such that an average smartphone camera, which has a 65 degree field of view, is able to capture the face of children of a certain age group. As shown in FIG. 17, the compartment may be configured so that an average smartphone camera having a 65 degree field of view is positioned to capture the face of a 50th percentile in height twelve-year-old child user.

Spinners

In another set of embodiments, the playground apparatus is a spinner.

Embodiments of the present disclosure, including the embodiments shown in FIGS. 18 through 30, are directed to a spinner 400 comprising a compartment 10 that is sized and configured to hold a smartphone in place during the motion of the spinner. Each compartment 10 is configured so that a user may place his/her phone into the compartment 10 and leave it there during the duration of a spinning activity. The compartment 10 is also positioned and configured to hold the smartphone at a location and angle to photograph at least the face of an occupant of the spinner 400. Using a timer and/or a remote activator, a user may take a picture of the occupant enjoying the spinning activity. Alternatively, a user may take video of the occupant enjoying the spinning activity.

The spinner 400 may take on any of a variety of configurations. In general, a spinner 400 is a playground component having a seat 401 that is configured to spin 360 degrees about a central mount. In contrast to a whirl, which has a relatively large base that supports a plurality of occupants, a spinner 400 typically comprises only a single seat 401. In conventional spinners 400, the seat 401 is sized and configured to hold only one child occupant at any given time. In embodiments of the present disclosure, however, the seat 401 may be sized and configured to hold multiple occupants, for instance one adult caretaker and one child, at a given time.

A spinner seat 401 may take on any of a variety of configurations. For example, some spinner seats 401 may be bowl or cup seats, in which an occupant sits in the interior of a bowl/cup, typically with his/her legs extending out of the bowl/cup. Other spinner seats 401 may be shaped more in the shape of a chair, with a lower seating surface and an upward-extending back support (and sometimes with handles on each side). Yet other spinner seats 401 may be saddle seats, in one or more of the front, rear, left side, and right side of the seating surface (which may be substantially flat or sunken) extend upward to provide a user with a surface to grab and hold.

In yet other embodiments, in place of a seat 401, the spinner 400 may comprise one or more handles extending upward from a small base on which one or more children may stand.

A first embodiment of a spinner 400 is shown in FIGS. 18 through 24. As illustrated, the spinner 400 comprises a seat 401 that forms a large bowl. More generally, the seat 401 comprises a lower support surface 402 that is configured to support an occupant in a sitting position, an upper frame 403 through which the occupant enters and exits the seat, and one or more walls extending between the lower support surface and the upper frame. Where the seat 401 forms a large bowl, as illustrated, a single wall 404 extends between the lower support surface and the upper frame 403 around the entirety of the seat.

The seat 401 may be a single integral structure. In the embodiment illustrated in FIGS. 18 through 24, for instance, the lower support surface 402 is be integrally molded with wall 404 and upper frame 403. In other embodiments, however, the seat 401 may be made up of multiple components, which may be affixed together by conventional means.

The phone-holding compartment 10 may be located in any one of the one or more walls 404 and/or in the upper frame 403. As in the illustrated embodiment, for instance, where the seat 401 comprises a single wall 404 extending around the entirety of the seat, the phone-holding compartment 10 may be located in that wall 404.

In some embodiments, the upper frame 403 may be curved or angled, such that the seat 401 has a defined front and rear, in which the upper frame at the rear 405 is vertically higher than the upper frame at the front 406 (i.e. wall 404 extends higher upward at the rear of the seat than at the front of the seat). This may provide an occupant with a greater degree of back support than a conventional cup/bowl seat. This may be of particular importance in those embodiments in which the seat 401 is configured to hold multiple occupants, e.g. a caretaker and a child, at the same time. It may also help ensure that the occupant is sitting in a position that will locate his or her face at a desirable location for a phone in the phone-holding compartment 10 to photograph or video the occupant's face.

In embodiments where the bowl seat 401 is provided with a front and a rear, the phone-holding compartment 10 is desirably located at the front of the seat, e.g. in the wall 404 at the front of the seat. By providing the seat 401 with a defined front and rear and positioning the phone-holding compartment 10 at the front of the seat, e.g. in the upper frame 403 and/or the wall 404 at the front of the seat, it is more likely that a user will see the phone-holder compartment during use and be able to identify it as such.

Figure 20:
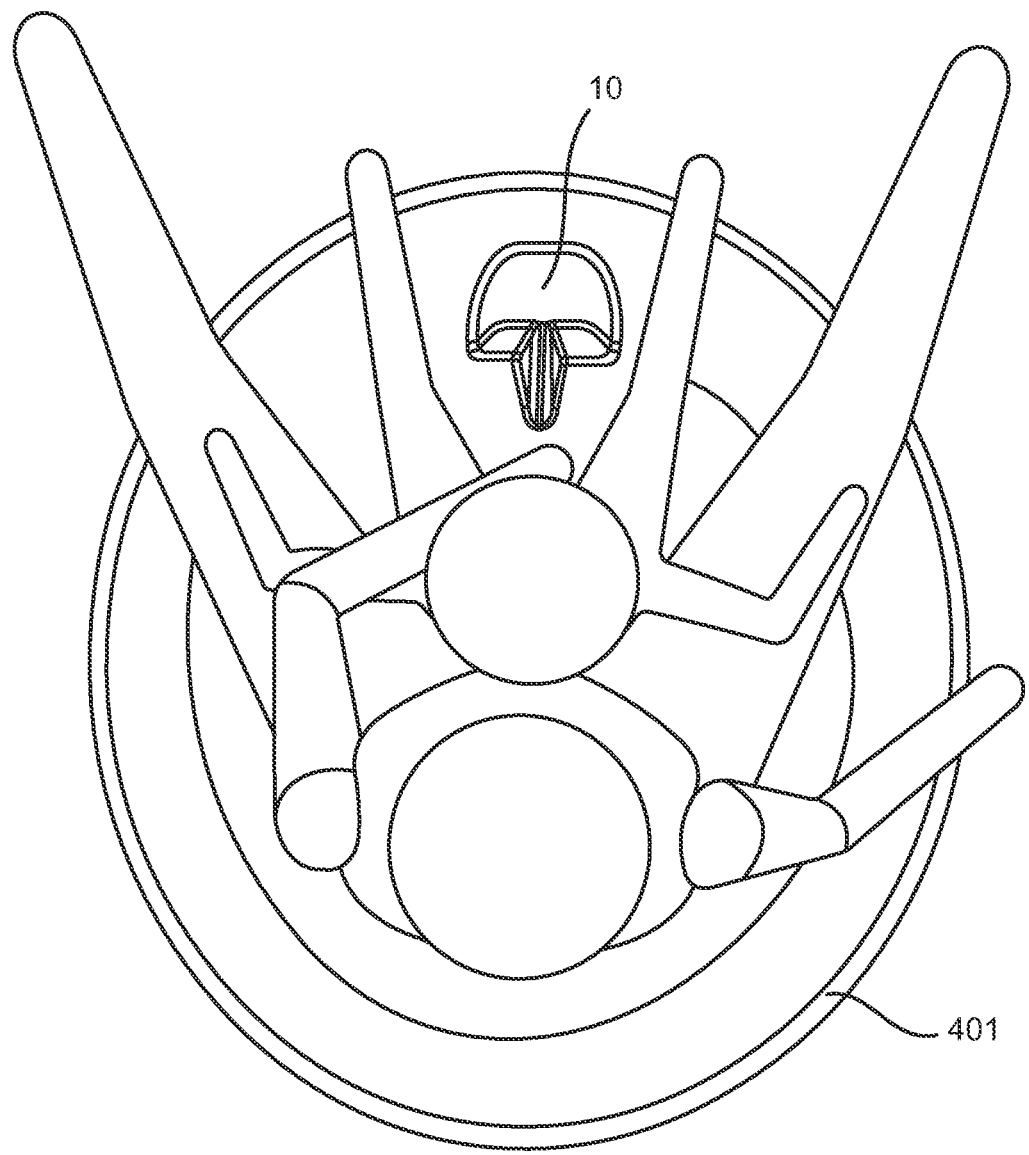
FIG. 20 is a top plan view of the spinner shown in FIG. 18, showing an adult and a child simultaneously sitting in the spinner seat.
Figure 21:
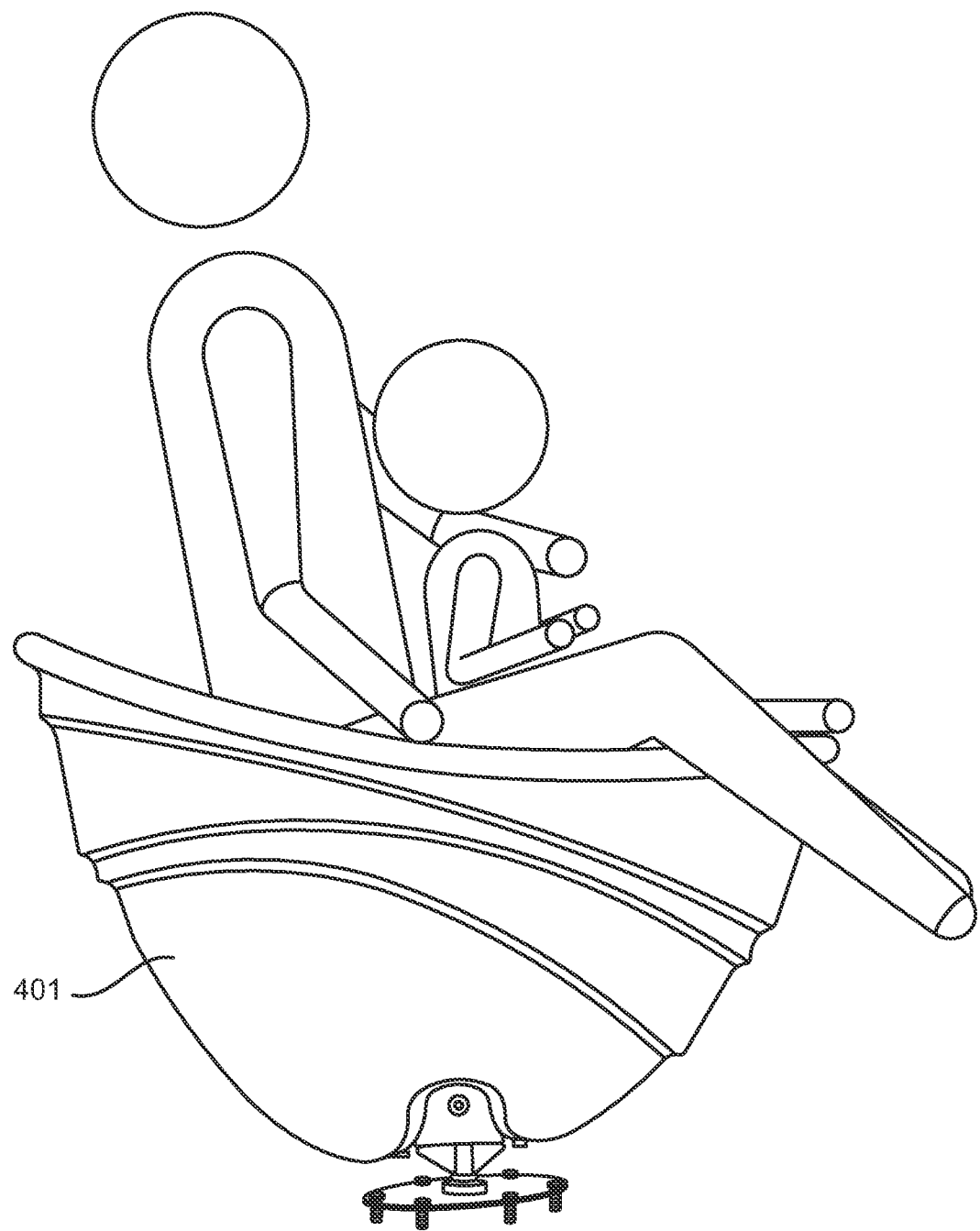
FIG. 21 is a side elevation view of the spinner shown in FIG. 18, showing an adult and a child simultaneously sitting in the spinner seat.
Figure 22:
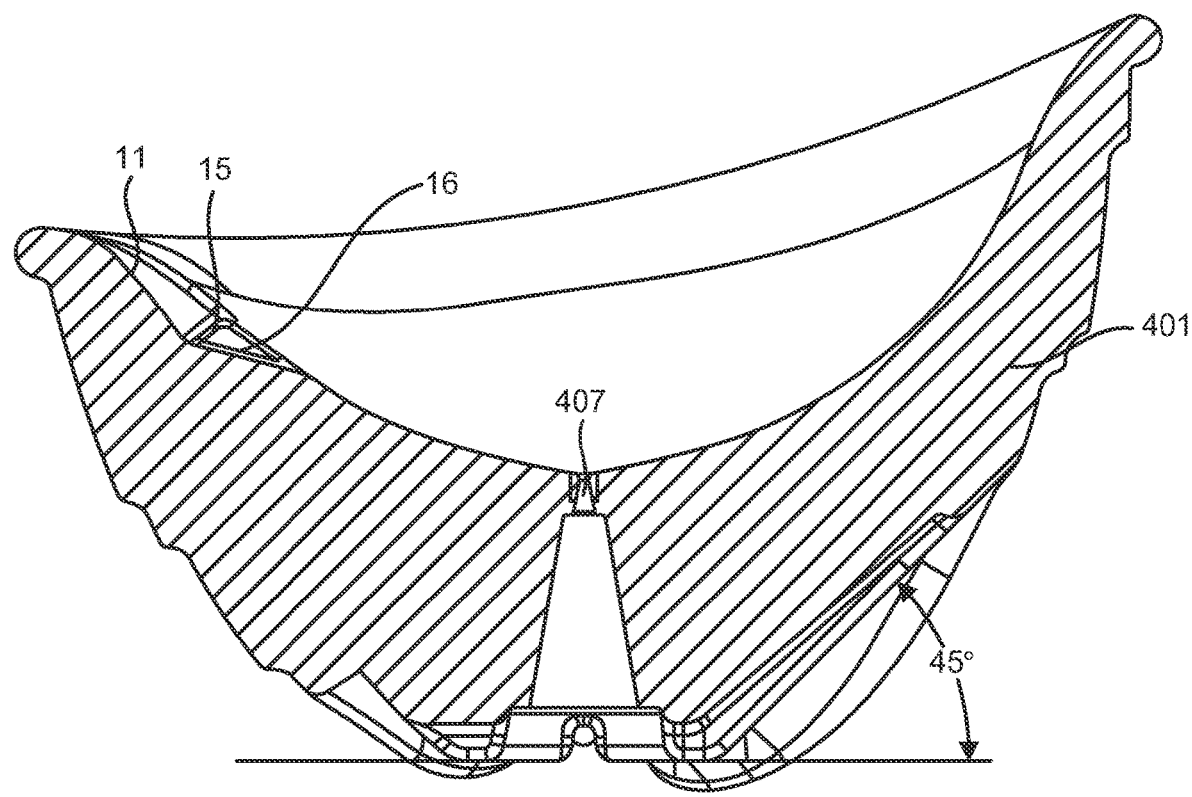
FIG. 22 is a cross-sectional view of the spinner seat shown in FIG. 18.

As noted above, in some embodiments, the seat 401 may be sized and configured to simultaneously hold an adult and a child. An example of such a seat 401 is shown in FIGS. 20 and 21. As evident from the illustrated seat, the distance between the front and the rear of the seat is increased relative to a conventional cup/bowl seat. In embodiments of the seat 401, for instance, the distance between the front (as measured from the upper frame at the front 406 of the seat) and the rear (as measured from the upper frame at the rear 405 of the seat) is at least 25 inches, alternatively at least 30 inches. Similarly, the distance between the right side of the seat and the left side of the seat (as measured between the upper frame 403 at the right and the upper frame at the left is at least 22 inches, alternatively at least 25 inches.

The seat 401 may be rotatably mounted to a support structure so as to provide the seat with the ability to spin 360 degrees by any conventional manner, as would be understood by persons of skill in the art. In other embodiments, however, the support structure may be configured to provide the seat 401 with multi-axis movement, such as through the rotation of a portion of the mounting assembly in addition to the spinning of the seat, as is described herein.

The phone-holding compartment 10 may comprise at least a phone support surface, or wall, 11 and a bottom surface, or ledge 15. At least the phone support surface 11 is desirably angled so that a smartphone placed in the compartment 10 is angled toward the face of an occupant of the seat 401. In the illustrated embodiments, for example, phone support surface 11 is angled upward.

The particular angle of the phone support surface 11 will depend on the elevation of the compartment 10 above the lower support surface 402 of the seat. Where the compartment 10 is positioned toward the top of wall 404, for example, the phone support wall 11 may be angled between about 10 degrees and about 70 degrees from vertical, alternatively between about 15 degrees and about 65 degrees from vertical, alternatively between about 20 degrees and about 60 degrees from vertical, alternatively between about 25 degrees and about 55 degrees from vertical, alternatively between about 30 degrees and about 50 degrees from vertical, alternatively between about 35 and about 45 degrees from vertical, alternatively about 40 degrees from vertical.

The bottom ledge 15 may also be angled upward away from the phone support surface 11 so as to prevent a phone from sliding out of the phone-holding compartment 10. In some embodiments, for example, the bottom ledge 15 may be angled between about 10 degrees and about 70 degrees from horizontal, alternatively between about 15 degrees and about 65 degrees from horizontal, alternatively between about 20 degrees and about 60 degrees from horizontal, alternatively between about 25 degrees and about 55 degrees from horizontal, alternatively between about 30 degrees and about 50 degrees from horizontal, alternatively between about 35 and about 45 degrees from horizontal, alternatively about 40 degrees from horizontal. As illustrated, the bottom ledge 15 may form a right angle with the phone support surface 11.

The bottom ledge 15 may also have a depth that is configured to prevent a phone from falling out of the phone-holding compartment 10 during use of the spinner 400. For instance, the bottom ledge may be at least ½ inch deep, more desirably at least 1 inch deep.

The phone-holding compartment 10 may also comprise one or more drainage tracks 16. The drainage track(s) 16 allows for water, e.g. from rain and the like, to exit the compartment 10. The drainage track(s) 16 may be located in the bottom surface 15 of the compartment 10. In some embodiments, such as that shown in the illustrated embodiments, a drainage track 16 may be located at or near the center of the bottom surface 15 and each side of the bottom surface may be angled downward toward the central point containing the drainage track. In other embodiments, a plurality of drainage tracks 16 may be located at various locations across the bottom surface 15, such as at each corner of the compartment 10 for example.

Figure 23:
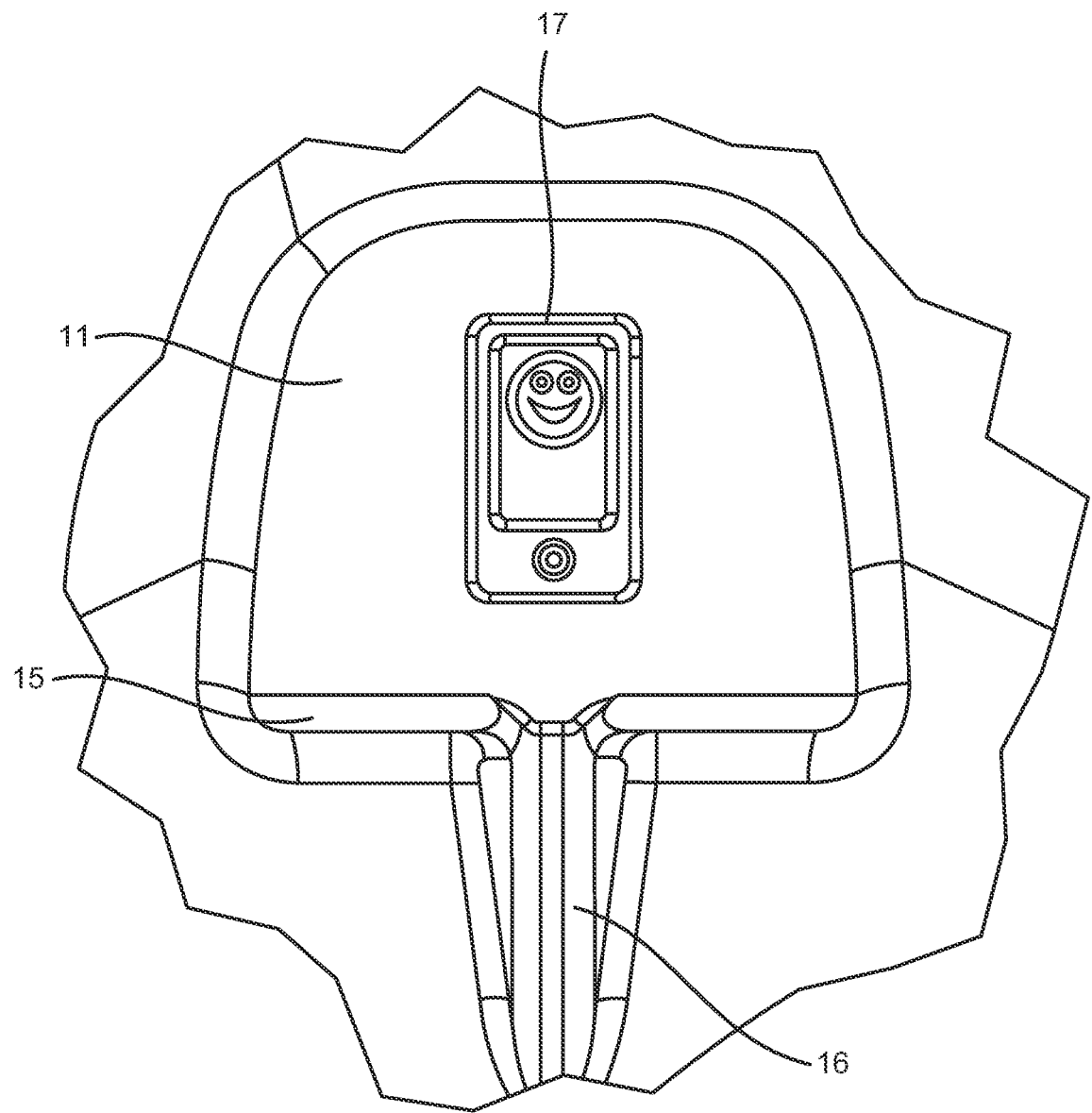
FIG. 23 is a front elevation view of an embodiment of a phone holder such as that present on the spinner shown in FIG. 18.

The bottom surface 15 may be divided into a plurality of sections by the one or more drainage tracks 16. As shown in FIG. 23, for instance, the bottom ledge 15 may be split to left and right sections by a central drainage track 16. Regardless of the drainage track 16, however, the bottom ledge 15 is configured so that the bottom edge of a phone rests on and is supported by the ledge.

As shown in the illustrated embodiments, each of the one or more drainage track(s) 16 may be angled downward to allow for water to run out of the phone-holding compartment and into the seat 401. The seat 401 may, itself, contain one or more drainage holes 407 out of which water may flow. For instance, the lower support surface 402 of the seat may have one or more drainage holes 407 through which water may flow out of the seat 401. Accordingly, water that flows out of the phone-holding compartment 10 through the one or more drainage track(s) 16 will flow into the bottom of seat 401 and subsequently through the one or more drainage holes 407 to the exterior of the seat. In other embodiments, the phone-holding compartment 10 may comprise one or more drainage through-holes (as opposed to tracks), such that water flows directly from the compartment to the exterior of the seat 401.

In some embodiments, the compartment 10 may include one or more phone securing elements. For instance, the compartment 10 may comprise one or more flexible tabs that are deformed or deflected when a phone is placed into the compartment. The tabs may press against the phone to provide additional securement of the phone in the compartment. As another example, the compartment may have a dimension that provides for a friction fit with an inserted phone. Or, for example, the phone support wall 11 may be made out of a material that prevents slippage of the phone or may contain a friction-enhancing coating.

The seat 401 may also comprise a visual indicator 17 that indicate to a user that the one or more compartments 10 are for holding a smartphone to take a photograph and/or video of an occupant of the whirl. An example of such an indicator 17 is shown in FIG. 23. The visual indicator 17 may be located anywhere on the seat 401, including for example on wall 404 in the vicinity of the phone-holding compartment 10. In the illustrated embodiments, visual indicator 17 is located on the phone support wall 11 of the compartment 10. The visual indicator 17 may desirably be integral with, e.g. molded or stamped into, the material that makes up the phone-holding compartment 10 and/or wall 404, such as is shown in the illustrated embodiment. However, the application of a visual indicator 17 using a sticker, adhesive, or the like is also contemplated. The visual indicator 17 may also have any design, so long as the design provides a user with some indication of the intended use of the compartment 10.

Figure 24:
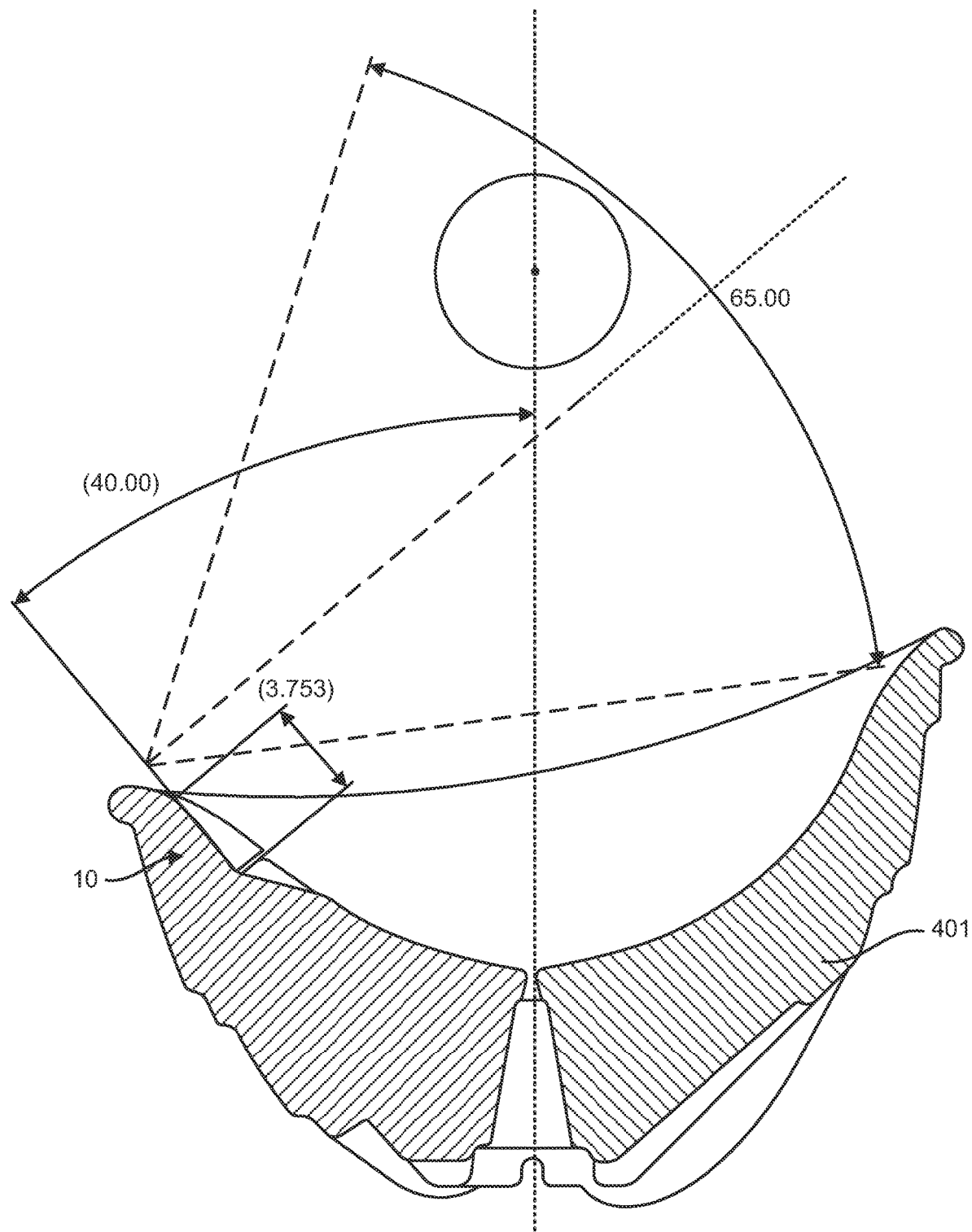
FIG. 24 is a cross-sectional view of the spinner seat shown in FIG. 18, showing a configuration of the phone holder such that an average smartphone camera will capture the face of a 50th percentile twelve-year-old child occupant.

In some embodiments, the phone-holder compartment 10 may be positioned at a height and angle such that an average smartphone camera, which as a 65 degree field of view, is able to capture the face of children of a certain age group. As shown in FIG. 24, the compartment may be configured so that an average smartphone camera having a 65 degree field of view is positioned to capture the face of a 50th percentile in height twelve-year-old child user.

Figure 28:
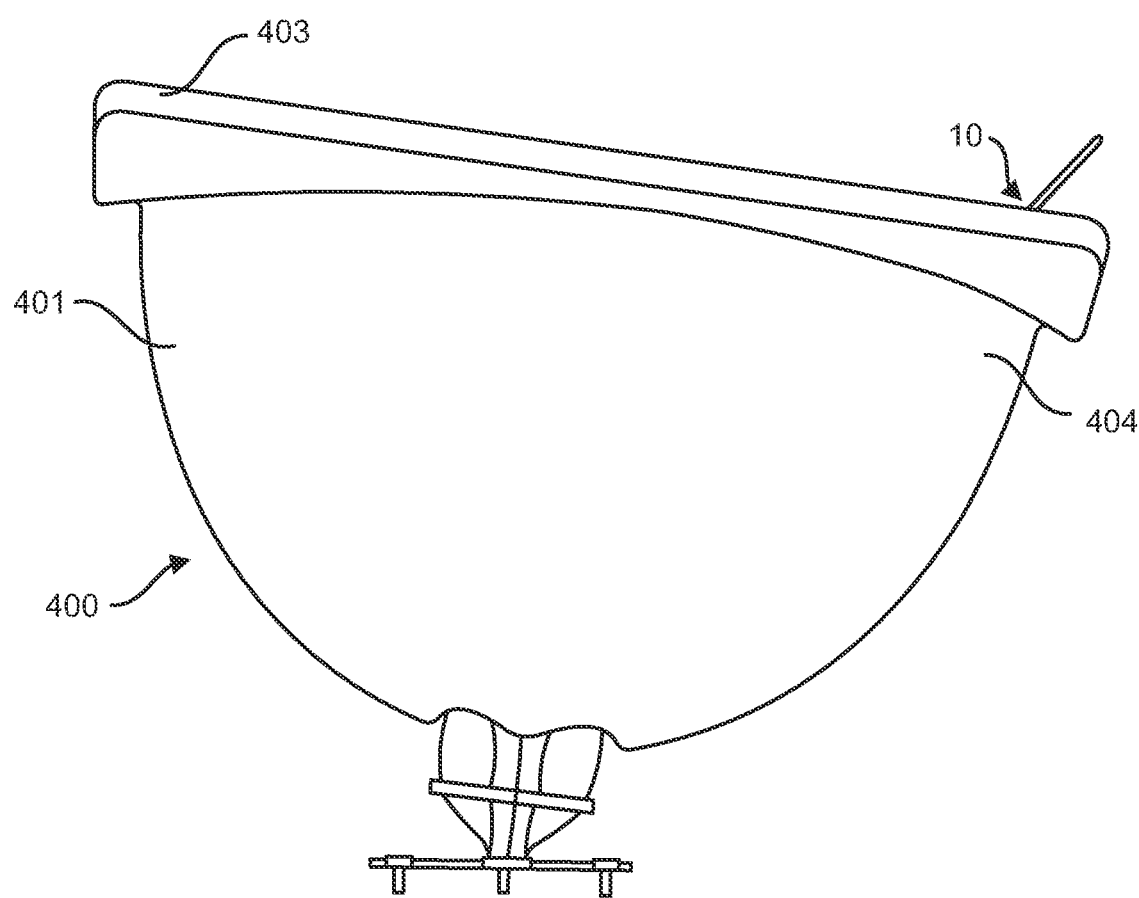
FIG. 28 is a perspective view of a second embodiment of a spinner having a phone holder configured to position a phone so as to take a photograph of a seat occupant during operation of the spinner.
Figure 29:
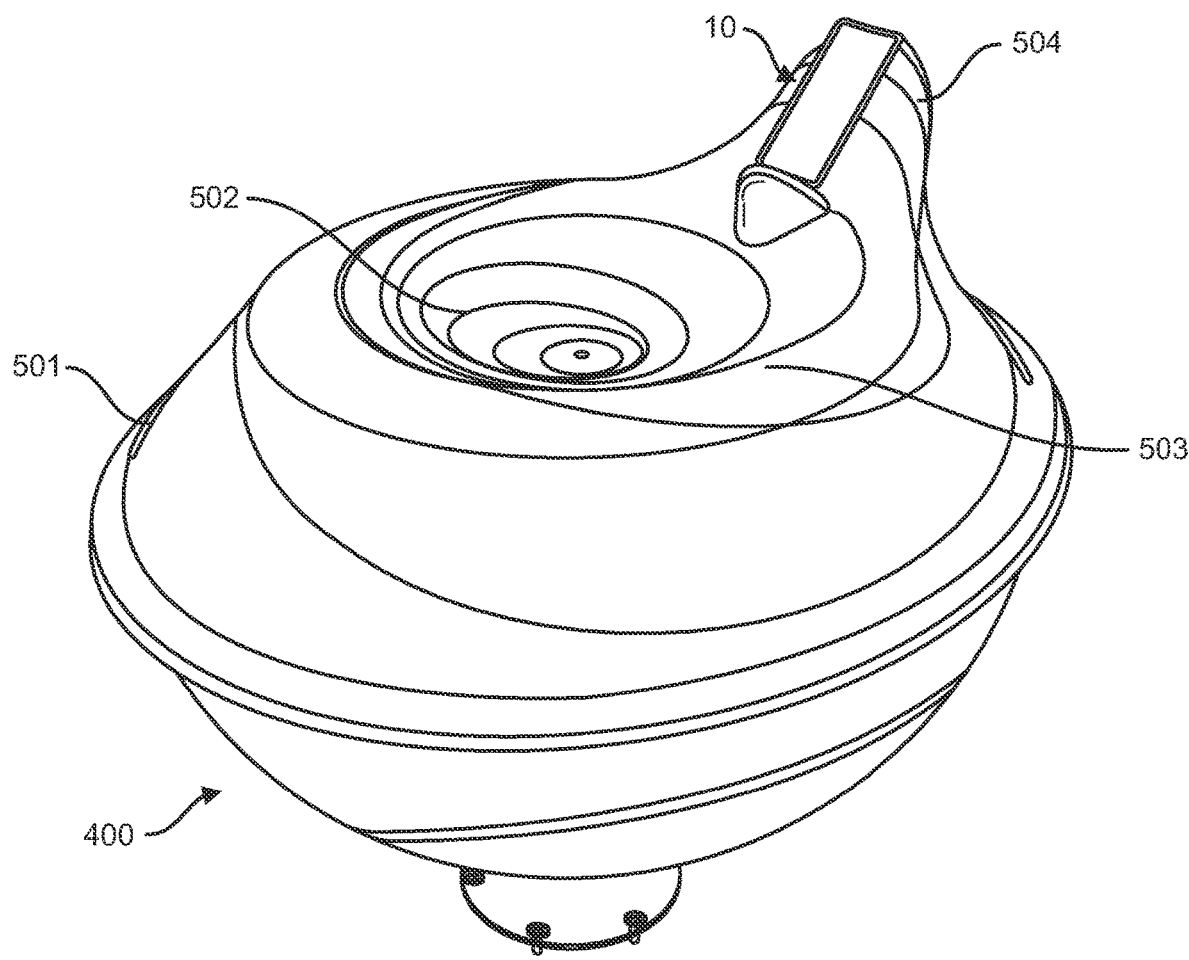
FIG. 29 is a perspective view of a third embodiment of a spinner having a phone holder configured to position a phone so as to take a photograph of a seat occupant during operation of the spinner.
Figure 30:
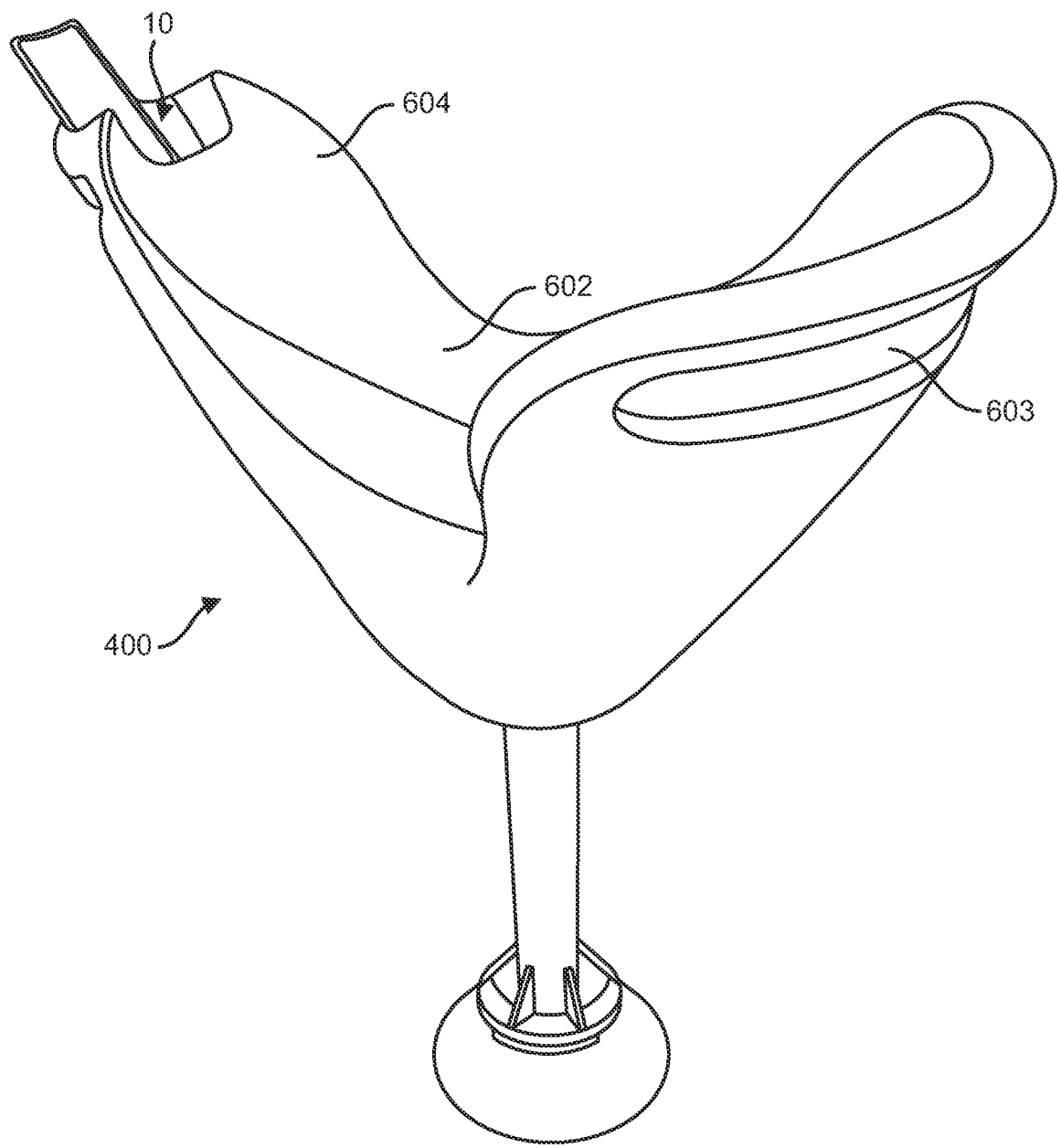
FIG. 30 is a perspective view of a fourth embodiment of a spinner having a phone holder configured to position a phone so as to take a photograph of a seat occupant during operation of the spinner

Other embodiments of spinner seats 401 comprising a phone-holding compartment 10 are shown at FIGS. 28 to 30.

The spinner 400 shown in FIG. 28, for example, has seat 401 in the shape of a conventional bowl seat comprising a lower support surface 402, an upper frame 403, and an integral wall 404 that surrounds the entire circumferential periphery of the seat. A phone is shown extending upward from a phone-holding compartment 10 that is positioned at the top of wall 404.

The spinner 400 shown in FIG. 29 comprises a new type of seat 501, in which a lower support surface 502 is sunken only slightly relative to a peripheral edge 503. The peripheral edge 503 includes a steep incline at the front of the seat 501, thereby creating a front projection 504. A phone-holding compartment 10, such as that described herein, is provided on the front projection 504.

The spinner 400 shown in FIG. 30 comprises a new type of saddle seat 601, comprising a lower support surface 602, a back support 603, and a front projection 604. A phone-holding compartment 10, such as that described herein, is provided on the front projection 604.

As noted above, in some embodiments, the spinner 400 may comprise a support structure 450 that is configured to provide the seat with multi-axis movement, such as through the rotation of a portion of the mounting assembly in addition to the spinning of the seat. Notably, the new support structure 450 described herein may be used in conjunction with any of a variety of spinner seats, regardless of whether or not the seat includes a phone-holding compartment. However, the embodiment of seat 401 shown in FIGS. 18-24 may be configured to operate with a multi-axis movement support structure 450, as seen for example in FIGS. 22, 26, and 27.

Figure 25:
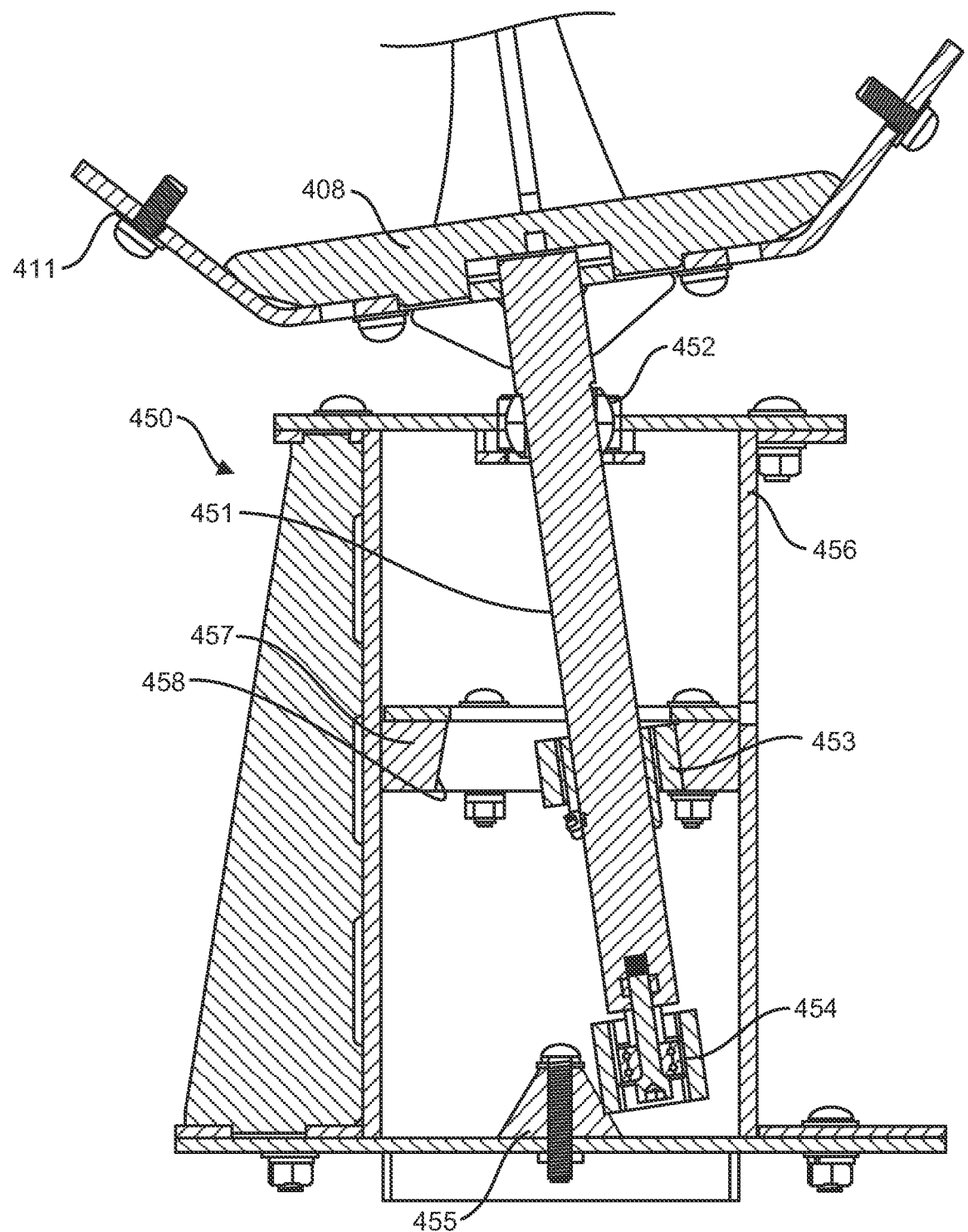
FIG. 25 is a cross-sectional view of a mounting assembly for a spinner, the mounting assembly being configured to provide a spinner seat with both a spinning movement and a rotating movement.

In some embodiments, a playground spinner 400 may comprise a support structure 450 that is configured to provide a user with both a spinning movement and a rotating movement. The spinner may comprise a seat 401 and a support assembly 450 comprising a drive shaft 451, a swivel bearing 452, and a drive wheel 453. An example of such a support assembly 450 is shown in FIG. 25.

Figure 26:
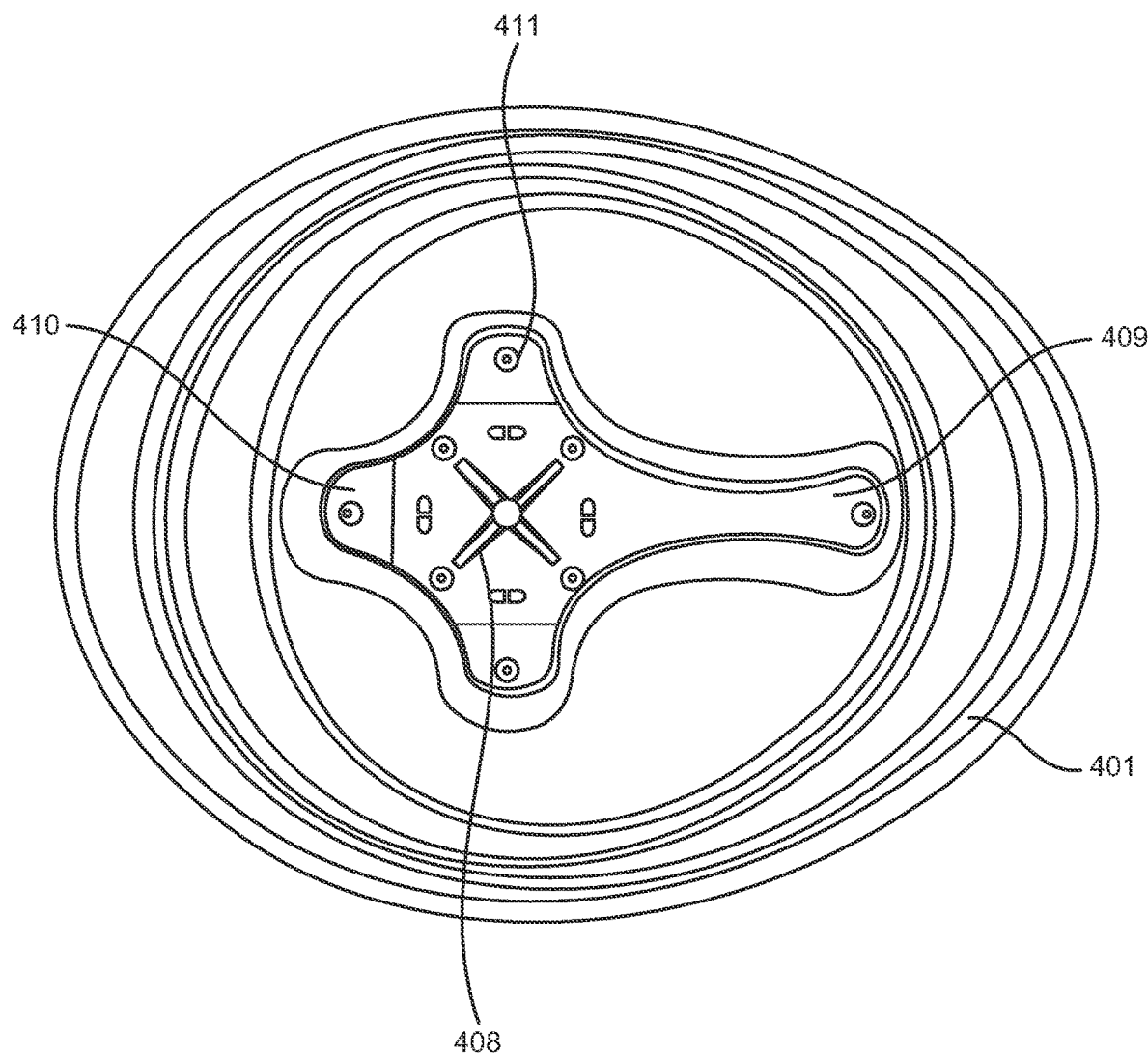
FIG. 26 is a bottom plan view of a spinner seat, such as that shown in FIG. 18, having a mounting plate that provides additional strength to better withstand the rotating movement.
Figure 27:
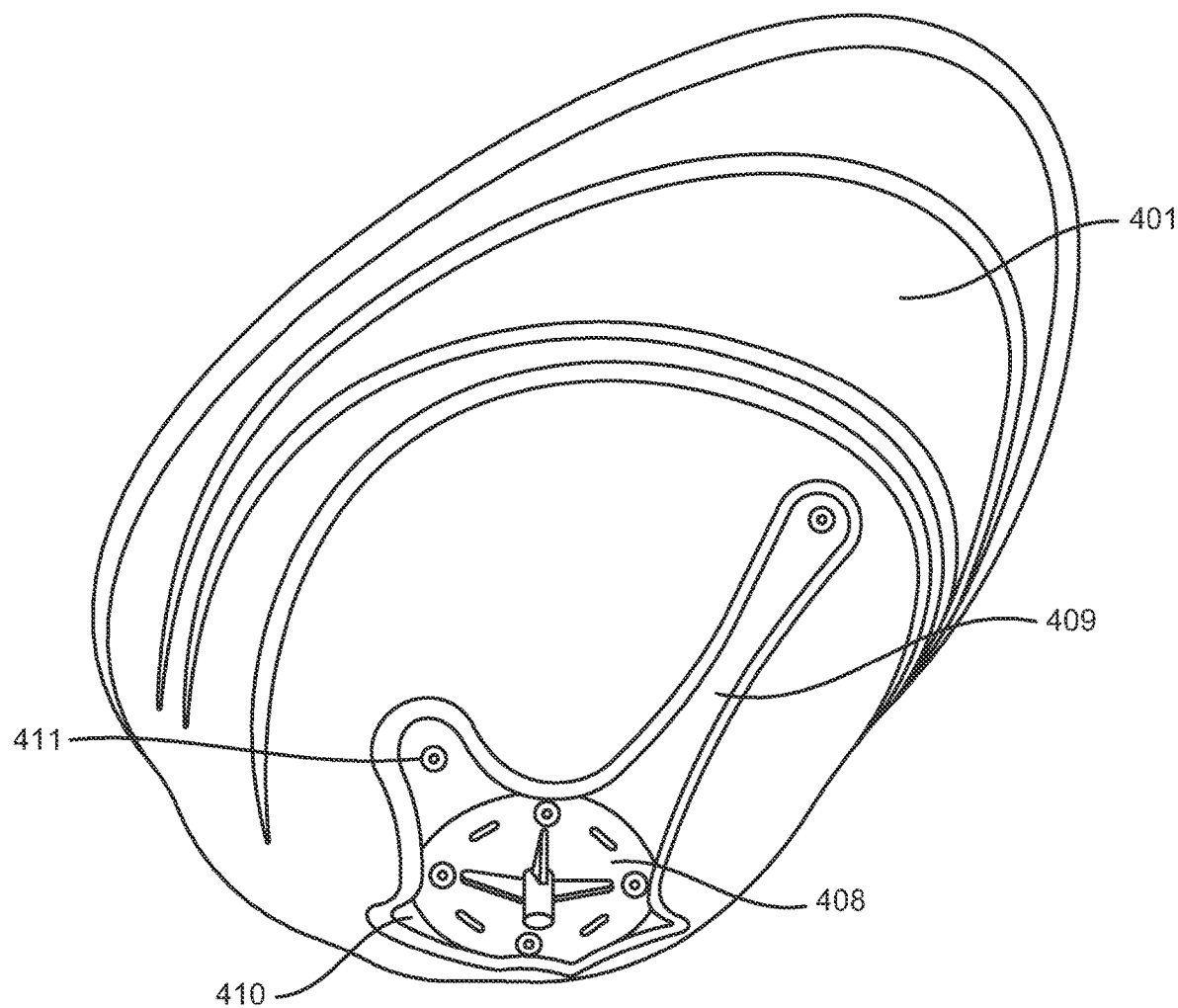
FIG. 27 is a lower perspective view of the spinner seat shown in FIG. 26.

The seat 401 may be secured to the drive shaft 451 through the use of conventional fasteners. In some embodiments, the seat 401 may comprise a conventional mounting feature on the underside of the seat. Because of the multi-axis movement, however, it may be desirable to provide the seat 401 with an extended mounting feature 408 that comprises one or more protrusions. As shown in FIGS. 26 and 27, for instance, the extended mounting feature 408 may comprise a protrusion 409 that extends up the rear wall of the seat, a protrusion 410 that extends up the front wall of the seat, side protrusions 411 that each extend up one of the side walls of the seat, or a combination thereof. By using an extended mounting feature 408 such as that described herein, one may provide the seat 401 with additional structural support to account for the added stresses placed on the seat by the multi-axis movement (and the associated shifting of weight of the occupant(s) of the seat).

The drive shaft 451 comprises a longitudinal axis that spans between a first end of the drive shaft and a second end of the drive shaft. A first end of the drive shaft 451 is secured to the seat 401 as described above. The second end of the drive shaft 451 may comprise a tensioning mechanism, such as an idler wheel 454 which is configured to roll upon a fixed surface 455. In other (non-illustrated) embodiments, the second end of the drive shaft 451 may be a free end or may be attached to another component, such as a counterweight.

The drive shaft 451 is connected to the rest of the support assembly 450 in a manner that allows the drive shaft to spin 360 degrees about its longitudinal axis. For instance, the drive shaft 451 may be attached to a support structure housing 456 by way of swivel bearing 452. Swivel bearing 452 allows the drive shaft 451 to spin about its longitudinal axis while also allowing for a limited amount of angular movement of the drive shaft within the housing 456.

As illustrated, for example, swivel bearing 452 may be positioned in a top surface, or cap, of the housing 456 through which the drive shaft 451 extends. In some embodiments, the support structure 450 may be installed such that the top surface of the housing 456 is flush or substantially flush with the play surface. In that way, the housing 456 is concealed below the play surface, e.g. below ground, and is not accessible to users of the playground.

By providing a seat 401 that extends outward a sufficient distance from the drive shaft 451, one may also prevent a person from having a foot or a hand pinched between the underside of the seat 401 and the top of the housing 456. The seat 401 of the illustrated embodiment, for instance, has a wall 404 that curves outward as it increases in height from a lower portion to an upper portion, creating a seat having a rounded lower surface. Due to the angular rotation of the seat 401, therefore, the upper portion of the seat wall 404 will contact a person located in the immediate vicinity of the spinner 400 and operate to move that person away from the seat before any part of that person could become pinched between the lower portion of the seat wall (or the mounting element 408 attached thereto) and the housing 456.

The support structure also comprises a drive wheel 453, which is fixed to the drive shaft 451 and which rolls along a race 457. The rolling of the drive wheel 453 about the race 457 provides for rotation of the drive shaft about a vertical axis. The race 457, which may be fixed within the housing 456, has an angled surface 458 upon which the drive wheel 453 rolls. Contact between the drive wheel 453 and the angled surface 458 places the longitudinal axis of the drive shaft 451 at a tilt, or angle, with respect to a vertical axis. As a result, the spinning of the drive shaft 451 (about its longitudinal axis) occurs along a first, tilted (i.e. non-vertical) axis, and the rotation of the drive wheel 453 (and thus the drive shaft 451), about the race 457 occurs along a second, vertical axis. This provides the seat 401 with the multi-axis movement described herein.

The particular angle of the angled surface 458 of the race 457 defines the angle of the longitudinal axis of the drive shaft 451, and hence the angle about which the seat spins. The particular angle of surface 458 may therefore be selected to provide a spinner 400 with a desired movement. It has generally been found that for a desirable spinner 400 experience, the race surface 458 may have an angle of 15 degrees or less (relative to vertical), alternatively 12 degrees or less, alternatively 10 degrees or less. For instance, the surface 458 of the race 457 may be angled between about 3 degrees and about 15 degrees from vertical, alternatively between about 3 degrees and about 12 degrees from vertical, alternatively between about 3 degrees and about 10 degrees from vertical, alternatively between about 5 degrees and about 15 degrees from vertical, alternatively between about 5 degrees and about 12 degrees from vertical, alternatively between about 5 degrees and about 10 degrees from vertical, alternatively between about 6 degrees and about 10 degrees from vertical, alternatively between about 7 degrees and about 9 degrees from vertical, alternatively about 8 degrees from vertical. As the angle is increased, the rotation of the seat 401 about the vertical axis becomes more extreme for the occupant(s) and the stresses placed on the seat during use become higher.

The support structure 450 may also comprise a tensioning mechanism that keeps the drive wheel 453 in contact with the angled surface 458 of the race 457 and ensures that the drive shaft 451 is maintained along the defined tilt angle during use. Without any such tensioning mechanism, the drive shaft 451 would be capable of lateral motion, which results in a jerky and less-controllable spinning experience. In the illustrated embodiment, for example, the tensioning mechanism comprises an idler wheel 454 and a fixed surface 455.

The idler wheel 454 may be affixed to the lower end of the drive shaft 451 and is configured to spin in the opposite direction from the drive shaft 451. The idler wheel 454 contacts and rolls along affixed fixed surface 455, thereby maintaining contact between the drive wheel 453 and the race 457. Fixed surface 455 is desirably also angled relative to vertical. For example, fixed surface 455 may be angled at the same or substantially the same angle as surface 458 of race 457 or it may have a greater angle relative to vertical. Fixed surface 455 may be an integral part of housing 456 or may be provided by a separate component such as a tensioning pin.

The multi-axis movement that results from the support structure 450 described herein delivers a spinner 400 that provides an entirely new play experience. Namely, an occupant of the seat 401 is able to spin about the tilted longitudinal axis of the drive shaft 451 while the seat simultaneously rotates about a vertical axis. The result is a motion that by a seat occupant can easily maintain simply be using his or her core muscles. In contrast to conventional spinners, the occupant need not push off the ground to cause the movement, nor is any interaction (e.g. a push) from a non-occupant individual needed. Further, an occupant may easily cause the direction of the spinning and rotation to change from a first direction to a second direction, providing a user with a new degree of control over the spinning motion that is not achieved by conventional playground spinners.

In other embodiments, support structure 450 may be associated with a standing spinner unit 400 (instead of one having a seat) to provide a standing spinner unit with the multi-axis movement described herein. For example, in some (non-illustrated) embodiments seat 401 may be replaced with a platform, or base, on which one or more children stand. The platform is also preferably comprises one or more handles that a user may hold onto during the spinning and rotating movement of the spinner 400. In some embodiments, the platform may be configured for a single user to stand in the center and hold onto one or more handles located at or near the periphery, e.g. circumference, of the platform. This will provide a user with maximum control over the multi-axis movement, as described above with respect to the seated embodiment. In other embodiments, however, the platform may be configured for multiple children to work together to control the multi-axis movement of the spinner 400.

It can be seen that the described embodiments provide unique and novel playground structures having a number of advantages over those in the art. While there is described herein certain specific elements embodying the invention, it will be manifest to those skilled in the art that various modifications and rearrangements of the elements may be made without departing from the spirit and scope of the underlying inventive concept and that the same is not limited to the particular forms herein shown and described except insofar as indicated by the scope of the appended claims.

What is claimed:

1. A playground spinner comprising
a seat configured to rotate 360° about a central mount; and
a phone-holder compartment, the phone-holder compartment being sized and configured to hold a smartphone at a location and angle to photograph the face of an occupant of the seat during rotation of the seat;
wherein the seat comprises
a lower support surface configured to support an occupant of the seat in a sitting position,
an upper frame through which an occupant enters and exits the seat, and
one or more walls extending between the lower support surface and the upper frame; and
wherein the compartment is located in one of the one or more walls.

2. The playground spinner of claim 1, wherein the compartment is configured so that an average smartphone camera having a 65 degree field of view is positioned to capture the face of a 50th percentile in height twelve-year-old child occupant of the seat.

3. The playground spinner of claim 1, wherein the seat is mounted to a drive shaft that (i) spins about a non-vertical longitudinal axis and (ii) rotates about a vertical axis.

4. The playground spinner of claim 3, wherein the spinning and rotating movement is provided by a mounting assembly comprising:
a drive shaft that spins about a longitudinal axis; and
a drive wheel that provides for rotation of the drive shaft about a vertical axis, wherein the drive wheel contacts an angled surface to place the longitudinal axis of the drive shaft at an angle with respect to vertical.

5. A playground spinner comprising:
a seat configured to rotate 360° about a central mount; and
a phone-holder compartment, the phone-holder compartment being sized and configured to hold a smartphone at a location and angle to photograph the face of an occupant of the seat during rotation of the seat;
wherein the seat comprises
a lower support surface configured to support an occupant of the seat in a sitting position,
an upper frame through which an occupant enters and exits the seat, and
a single wall extending between the lower support surface and the upper frame around the entirety of the seat, thereby forming a bowl in which a user sits.

6. The playground spinner of claim 5, wherein the wall is integral with the lower support surface and the upper frame.

7. The playground spinner of claim 5, wherein the upper frame is curved or angled such that the seat has a defined front and rear, in which the upper frame at the rear of the seat is higher than the upper frame at the front of the seat.

8. The playground spinner of claim 7, wherein the compartment is located in the wall at the front of the seat.

9. The playground spinner of claim 8, wherein the compartment comprises a bottom ledge and a phone support surface.

10. The playground spinner of claim 9, wherein the phone support surface is angled between about 30 degrees and about 50 degrees relative to vertical.

11. The playground spinner of claim 9, wherein the bottom ledge comprises a drainage slot.

12. The playground spinner of claim 9, wherein the phone support surface comprises a visual indicator that the compartment is for holding a smartphone to take a photograph.

13. The playground spinner of claim 7, wherein the distance between the front and the rear of the seat is at least twenty-five inches.

14. The playground spinner of claim 5, wherein the compartment is located in the wall and comprises a bottom ledge and a phone support surface.

15. The playground spinner of claim 14, wherein the phone support surface is angled between about 30 degrees and about 50 degrees relative to vertical.

16. The playground spinner of claim 5, wherein the compartment is located in the upper frame.

\* \* \* \* \*